US011892554B2

(12) United States Patent
Xu et al.

(10) Patent No.: US 11,892,554 B2
(45) Date of Patent: Feb. 6, 2024

(54) METHOD FOR IMPLEMENTING RADAR-COMMUNICATION INTEGRATION OF VEHICLE, RELATED DEVICE, AND SYSTEM

(71) Applicant: Huawei Technologies Co., Ltd., Shenzhen (CN)

(72) Inventors: Shaofeng Xu, Xi'an (CN); Zhiwei Zhang, Shanghai (CN); Botao Zhai, Xi'an (CN); Xueming Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 659 days.

(21) Appl. No.: 17/026,884

(22) Filed: Sep. 21, 2020

(65) Prior Publication Data
US 2021/0003661 A1 Jan. 7, 2021

Related U.S. Application Data

(63) Continuation of application No. PCT/CN2018/125831, filed on Dec. 29, 2018.

(30) Foreign Application Priority Data

Apr. 28, 2018 (CN) .......................... 201810407725.0

(51) Int. Cl.
*G01S 7/00* (2006.01)
*H04W 4/46* (2018.01)
(Continued)

(52) U.S. Cl.
CPC .............. *G01S 7/006* (2013.01); *G01S 7/023* (2013.01); *G01S 7/0235* (2021.05);
(Continued)

(58) Field of Classification Search
CPC ...... G01S 13/0209; G01S 13/42; G01S 13/58; G01S 13/931; G01S 2013/9316;
(Continued)

(56) References Cited

U.S. PATENT DOCUMENTS 4,733,238 A * 3/1988 Fiden ...................... G01S 7/006
342/60
5,248,979 A * 9/1993 Orme ....................... G01S 13/90
398/121
(Continued)

FOREIGN PATENT DOCUMENTS

CN 103576143 A 2/2014
CN 104155637 A 11/2014
(Continued)

OTHER PUBLICATIONS

Scheiblhofer, W., et al., "Method to Embed a Data-Link on FMCW Chirps for Communication Between Cooperative 77-GHz Radar Stations," Proceedings of the 12th European Radar Conference 2015 EuMA, 4 pages.

*Primary Examiner* — Peter M Bythrow
(74) *Attorney, Agent, or Firm* — Conley Rose, P.C.

(57) ABSTRACT

A method for implementing radar-communication integration of a vehicle, where the method includes obtaining, by a radar device of a first vehicle, a first communication message, modulating the first communication message into a first carrier signal, where an operating frequency of the first carrier signal is in an operating band of the radar device, sending a periodic radar signal, and sending the first carrier signal to a second vehicle within a time gap between sending of a radar signal in a current period and sending of a radar signal in a next period.

20 Claims, 16 Drawing Sheets

(51) Int. Cl.
*G01S 13/931* (2020.01)
*H04W 56/00* (2009.01)
*G01S 7/02* (2006.01)

(52) U.S. Cl.
CPC .............. *G01S 13/931* (2013.01); *H04W 4/46* (2018.02); *H04W 56/001* (2013.01); *G01S 2013/9316* (2020.01)

(58) Field of Classification Search
CPC ........ G01S 7/006; G01S 7/0235; G01S 7/023; H04W 4/46; H04W 56/001
See application file for complete search history.

(56) References Cited

U.S. PATENT DOCUMENTS

| | | | | |
|---|---|---|---|---|
| 5,966,091 | A * | 10/1999 | Andersson | G01S 13/86 342/60 |
| 7,315,239 | B2 | 1/2008 | Cheng et al. | |
| 7,423,577 | B1 * | 9/2008 | McIntire | G01S 7/006 375/295 |
| 7,515,091 | B2 * | 4/2009 | Meyers | G01S 13/66 342/60 |
| 7,605,745 | B2 * | 10/2009 | Honda | G01S 13/345 342/159 |
| 7,965,226 | B2 * | 6/2011 | Krikorian | G01S 13/22 342/131 |
| 7,978,123 | B2 * | 7/2011 | Lam | G01S 7/006 342/134 |
| 7,978,610 | B1 * | 7/2011 | McIntire | H04W 56/0065 370/278 |
| 8,130,680 | B1 * | 3/2012 | McIntire | H04L 5/1469 370/294 |
| 8,344,933 | B1 * | 1/2013 | Kronfeld | G08G 5/0008 342/25 R |
| 8,730,088 | B2 * | 5/2014 | Milligan | G01S 7/006 342/52 |
| 9,389,312 | B2 * | 7/2016 | Khlifi | G01S 7/006 |
| 9,791,550 | B2 * | 10/2017 | Mckitterick | G01S 7/35 |
| 9,864,043 | B2 * | 1/2018 | Franceschini | G01S 13/825 |
| 9,977,122 | B2 * | 5/2018 | Pitts | G01S 7/006 |
| 10,018,718 | B1 * | 7/2018 | Musgrove | G01S 7/414 |
| 10,024,953 | B2 * | 7/2018 | Johnson | G01S 13/34 |
| 10,140,868 | B1 * | 11/2018 | Lei | G08G 1/162 |
| 10,334,331 | B2 * | 6/2019 | Al-Stouhi | G07C 5/008 |
| 10,451,729 | B2 * | 10/2019 | Khlifi | G01S 13/86 |
| 10,511,667 | B2 * | 12/2019 | Zettler | H04W 72/12 |
| 10,598,763 | B2 * | 3/2020 | Kellum | H04B 7/086 |
| 10,698,080 | B2 * | 6/2020 | Seler | G01S 7/006 |
| 10,746,862 | B2 * | 8/2020 | Dammert | G01S 13/32 |
| 11,474,197 | B2 * | 10/2022 | Bayesteh | |
| 11,650,303 | B2 * | 5/2023 | Koch | G01S 13/931 342/196 |
| 2002/0003488 | A1 * | 1/2002 | Levin | G08G 1/163 342/60 |
| 2003/0102997 | A1 * | 6/2003 | Levin | G01S 13/931 340/902 |
| 2005/0059364 | A1 * | 3/2005 | Hansen | H04B 1/1027 455/73 |
| 2006/0049977 | A1 * | 3/2006 | Vacanti | G01S 13/882 342/121 |
| 2006/0145853 | A1 * | 7/2006 | Richards | G06K 7/10306 340/572.1 |
| 2006/0164292 | A1 * | 7/2006 | Buechler | G01S 7/006 342/52 |
| 2007/0096885 | A1 * | 5/2007 | Cheng | B60W 40/04 340/463 |
| 2007/0139253 | A1 * | 6/2007 | Meyers | G01S 13/106 342/60 |
| 2007/0164896 | A1 | 7/2007 | Suzuki et al. | |
| 2008/0018523 | A1 * | 1/2008 | Kelly, Jr. | G01S 7/354 342/21 |
| 2009/0237291 | A1 * | 9/2009 | Sakuma | G01S 5/0072 342/107 |
| 2010/0164789 | A1 | 7/2010 | Basnayake | |
| 2010/0194640 | A1 * | 8/2010 | Navarro | H01Q 21/061 342/372 |
| 2011/0118939 | A1 | 5/2011 | Kawamata et al. | |
| 2011/0221624 | A1 * | 9/2011 | Kavaler | G08G 5/0082 342/22 |
| 2012/0032833 | A1 * | 2/2012 | Milligan | G01S 7/006 342/59 |
| 2012/0200448 | A1 * | 8/2012 | Dowla | G01S 13/87 342/59 |
| 2014/0035774 | A1 * | 2/2014 | Khlifi | G01S 7/006 342/21 |
| 2017/0214746 | A1 | 7/2017 | Zettler et al. | |
| 2017/0243485 | A1 | 8/2017 | Rubin et al. | |
| 2017/0276770 | A1 * | 9/2017 | Lin | H01Q 25/002 |
| 2017/0310758 | A1 | 10/2017 | Davis et al. | |
| 2018/0090006 | A1 | 3/2018 | Ikenouchi et al. | |
| 2018/0113209 | A1 | 4/2018 | Campbell | |
| 2019/0094333 | A1 * | 3/2019 | Va | G01S 7/023 |
| 2020/0072963 | A1 * | 3/2020 | Yu | G01S 7/006 |

FOREIGN PATENT DOCUMENTS

| | | |
|---|---|---|
| CN | 105245584 A | 1/2016 |
| CN | 106249231 A | 12/2016 |
| CN | 106911605 A | 6/2017 |
| CN | 107786480 A | 3/2018 |
| DE | 102010038566 A1 | 2/2012 |
| EP | 3299839 A1 | 3/2018 |
| EP | 3748997 B1 | 7/2023 |
| JP | H11155167 A | 6/1999 |
| JP | 2007132768 A | 5/2007 |
| JP | 2007189436 A | 7/2007 |
| JP | 2007264932 A | 10/2007 |
| JP | 2016039437 A | 3/2016 |
| KR | 20120123900 A | 11/2012 |
| WO | 2012037680 A1 | 3/2012 |

* cited by examiner

METHOD FOR IMPLEMENTING RADAR-COMMUNICATION INTEGRATION OF VEHICLE, RELATED DEVICE, AND SYSTEM

CROSS-REFERENCE TO RELATED APPLICATIONS

This application is a continuation of International Patent Application No. PCT/CN2018/125831 filed on Dec. 29, 2018, which claims priority to Chinese Patent Application No. 201810407725.0 filed on Apr. 28, 2018. The disclosures of the aforementioned applications are hereby incorporated by reference in their entireties.

TECHNICAL FIELD

The present disclosure relates to the field of intelligent driving technologies, and in particular, to a method for implementing radar-communication integration of a vehicle, a related device, and a system.

BACKGROUND

In a driving process of a vehicle, a target (such as another motor vehicle, a non-motor vehicle, or a pedestrian) in an environment is a non-cooperative target relative to the vehicle. Usually, the non-cooperative target does not actively provide motion information (such as a motion status or a spatial location) of the non-cooperative target for the vehicle. If the vehicle can both obtain the motion information of the target in the environment (for example, performing radar detection) and exchange a short message service message with another vehicle, this helps implement perception, positioning, and route planning of the environment during advanced assisted driving or unmanned driving. In this specification, a function that can perform both radar detection and communication interaction may be briefly referred to as radar-communication integration.

Other approaches provide a solution of deriving a radar function from dedicated short-range communications (DSRC) to implement radar-communication integration, for example, deriving a radar function by relying on an 802.11ad technology. In addition to implementation of a communication function, location and speed detection of a target in an environment are completed through time synchronization and frequency synchronization. In this way, functions of radar detection and communication are both implemented.

However, in the solution of deriving the radar function from the DSRC, detection precision of a location, a speed, and the like of a target in an environment can hardly exceed that of a current vehicle-mounted radar sensor, and transfer of a communication short message service message is inefficient and has a relatively high delay such that a requirement of advanced assisted driving or unmanned driving cannot be met. Therefore, how to better implement a radar-communication integration function of a vehicle is still a severe technical challenge.

SUMMARY

Embodiments of the present disclosure provide a method for implementing radar-communication integration of a vehicle, a related device, and a system. Through implementation of the embodiments of the present disclosure, a vehicle not only can perform better radar detection, but also can improve communication short message service message transfer efficiency and reduce a communication delay, meeting a requirement of advanced assisted driving or unmanned driving to some extent.

According to a first aspect, an embodiment of the present disclosure provides a method for implementing radar-communication integration of a vehicle, which is described from a first vehicle side. The method includes obtaining, by a radar device of a first vehicle, a first communication message through a Controller Area Network (CAN) interface, modulating, by the radar device, the first communication message into a first carrier signal, where an operating frequency of the first carrier signal is in an operating band of the radar device of the first vehicle, and sending, by the radar device, a periodic radar signal using a transmit antenna, and sending the first carrier signal to a second vehicle within a time gap between sending of a radar signal in a current period and sending of a radar signal in a next period.

It can be learned that in this embodiment of the present disclosure, a communication message may be sent within a time gap between sending of radar signals in adjacent periods such that a vehicle not only can retain a function of detecting an environmental target using radar but also can interact and communicate with a target vehicle. The two functions may be independently performed, thereby ensuring compatibility between radar detection and communication functions. It may be understood that because the radar signal is a periodic signal, a time gap between radar signals in every two adjacent periods may be used to transfer a message. Therefore, message transmission efficiency is high, and a message delay is relatively low, thereby meeting a requirement of advanced assisted driving or unmanned driving to some extent, and improving practicability of the radar device and user experience.

Further, the radar device combines the first carrier signal and the radar signal in the current period into a radar-communication integration signal frame using a monolithic microwave integrated circuit (MMIC), where the radar-communication integration signal frame includes a radar signal and the first carrier signal that are alternate, and the radar device sends the radar-communication integration signal frame to the second vehicle using the transmit antenna. In this embodiment of the present disclosure, the first carrier signal may be briefly referred to as a communication message frame. That is, a new signal frame structure includes a radar signal frame and a communication message frame that are alternately designed, and a period is T. Through implementation of this embodiment of the present disclosure, a signal frame structure may be changed in real time based on a requirement. Such a radar-communication integration signal frame structure designed with the alternated radar signal and communication message frames can better ensure compatibility between radar detection and communication functions, and functions of the two frames are independent to reduce mutual impact. Through implementation of the radar-communication integration signal frame structure provided in this embodiment of the present disclosure, a message may be transferred using any communication message frame in the alternate frame structure. Therefore, message transmission efficiency is high, a message delay is relatively low, thereby meeting a requirement of advanced assisted driving or unmanned driving to some extent, improving practicability of the radar device, avoiding a traffic accident of a vehicle through message exchange, and improving vehicle driving safety.

In a possible implementation, the radar signal is, for example, a chirp signal. The chirp signal may be a sawtooth wave in a frequency-modulated continuous-wave (FMCW) modulation mode. Duration of a communication message may be adjusted based on an actual communication requirement. In one period T, duration (a frame length) of a communication message frame may be longer than duration (a frame length) of a radar signal, or may be shorter than duration (a frame length) of a radar signal.

In a possible implementation, the first carrier signal is, for example, frequency-shift keying (FSK) signal formed when the first communication message is modulated based on an FSK scheme. Based on robustness of FSK during demodulation, both a frequency jitter of a reference clock and a Doppler frequency jitter that is caused by different speeds of vehicles can be eliminated, and a relatively large frequency demodulation tolerance can be achieved within a limited intermediate frequency range.

Based on the first aspect, in a possible implementation, to enable the first vehicle and the second vehicle to fully use time gaps of their respective radar devices to perform coordinated and orderly communication, the time gap of the first vehicle may be divided into a first sending time range and a first receiving time range. The first sending time range indicates a time window within which the radar device sends the first communication message within the time gap, the first receiving time range indicates a time window within which the radar device receives a second communication message of the second vehicle within the time gap, there is a fixed time interval between the first receiving time range and the first sending time range, and the fixed time interval is a positive number greater than or equal to 0. Similarly, the time gap of the radar device of the second vehicle may also be divided into a second receiving time range and a second sending time range, and both the second receiving time range and the second sending time range are located within a time gap between radar signals in two periods of the radar device. The second receiving time range indicates a time window within which the radar device receives the first carrier signal, the second sending time range indicates a time window within which the radar device sends a second carrier signal to the first vehicle, there is a fixed time interval between the second receiving time range and the second sending time range, and the fixed time interval is a positive number greater than or equal to 0.

The sending, by the radar device of the first vehicle, the first carrier signal to a second vehicle within a time gap between sending of a radar signal in a current period and sending of a radar signal in a next period includes sending the first carrier signal to the second vehicle within the first sending time range. In addition, the method further includes receiving, by the radar device of the first vehicle within the first receiving time range using a receive antenna, the second carrier signal that is returned by the second vehicle based on the first carrier signal and that is used to reply to the first carrier signal, where the second carrier signal carries a second communication message, and demodulating, by the radar device, the second carrier signal using the MMIC, to obtain the second communication message.

It can be learned that in this embodiment of the present disclosure, the first vehicle and the second vehicle can fully use time gaps between radar signals of the first vehicle and the second vehicle to perform mutual communication, and send and receive short message service messages, thereby improving accuracy and efficiency of message transfer. In addition, the first vehicle and the second vehicle configure their respective sending time ranges and receiving time ranges, to avoid interference between communication messages and also avoid interference between a radar signal and a communication message such that the first vehicle and the second vehicle can smoothly and coordinately complete communication interaction in a timely manner.

Based on the first aspect, during actual application of this embodiment of the present disclosure, the first vehicle and the second vehicle may separately use radar devices with radar signals having different frame lengths or periods, the radar devices of the first vehicle and the second vehicle transmit radar signals at different moments, local clocks of the first vehicle and the second vehicle are inconsistent, or the like. In this embodiment of the present disclosure, to more fully use a time gap between radar signals, avoid signal interference, and ensure that the first vehicle and the second vehicle smoothly and coordinately complete communication interaction in a timely manner, the radar device of the second vehicle and/or the radar device of the first vehicle may further complete communication synchronization within the time gap between the radar signals based on synchronization information.

The synchronization information may be used to enable a message receiving end to keep clock frequency synchronization with a message sending end. On one hand, the synchronization information may be used to indicate a sending time range of a communication frame signal (such as a communication message or a response message) to the message receiving end, and on the other hand, may be used to indicate a clock pulse frequency of receiving the communication message to the message receiving end, thereby implementing communication synchronization.

In a specific embodiment, the first communication message includes first synchronization information, and the first synchronization information is used to indicate the first sending time range such that the second vehicle adjusts, based on the first sending time range, a second receiving time range of the second vehicle to synchronize the second receiving time range with the first sending time range, and duration of the second receiving time range is consistent with duration of the first sending time range. The second receiving time range indicates a time window within which the second vehicle receives the first carrier signal. It can be learned that the first vehicle may instruct, by sending the synchronization information, the second vehicle to align message sending and receiving time windows such that a sending window of the first vehicle is synchronized with a receiving window of the second vehicle. This helps the vehicles smoothly and coordinately complete communication interaction in a timely manner.

In a specific embodiment, the second communication message includes second synchronization information, the second synchronization information is used to indicate the second sending time range of the second communication message, and the second sending time range indicates a time window within which the second vehicle sends the second communication message. The radar device of the first vehicle obtains the second sending time range based on the second synchronization information using a microcontroller unit (MCU), and the radar device adjusts the first receiving time range within the time gap using the MCU such that the first receiving time range is synchronized with the second sending time range, and duration of the first receiving time range is consistent with duration of the second sending time range. A synchronization process includes determining, by the radar device of the first vehicle, a start point and an end point of the second sending time range in time domain using the MCU, adjusting a start point of the first receiving time range within the time gap to align with the start point of the second sending time range, and adjusting an end point of the first receiving time range within the time gap to align with the end point of the second sending time range. It can be learned that the first vehicle may receive the synchronization information from the second vehicle to align the message sending and receiving time windows with the second vehicle such that a receiving window of the first vehicle is synchronized with a sending window of the second vehicle. This helps the vehicles smoothly and coordinately complete communication interaction in a timely manner.

With reference to the first vehicle and the second vehicle, the following further describes a communication and synchronization process of the first vehicle and the second vehicle. When communication interaction is not required, on one hand, the radar devices of the vehicles periodically send and receive their respective radar signals, on the other hand, the radar devices of the vehicles are in a long receiving state for a communication message (where the long receiving state means that the radar device disables sending of a communication message and only receives a communication message from the outside). That is, the radar device of each vehicle is always ready to receive a communication message. When the first vehicle needs to communicate and interact with the second vehicle, the first vehicle first sends a communication message to the second vehicle within a time range of a time gap between two radar signals of the first vehicle. The time range may be referred to as a sending time range t1. Because the radar device of the second vehicle is still in the long receiving state, the radar device of the second vehicle always receives the communication message (where the communication message includes synchronization information). After receiving the communication message, on one hand, the radar device of the second vehicle confirms the sending time range t1 of the communication message based on the synchronization information, and uses the sending time range t1 as a receiving time range t1 of the second vehicle. That is, subsequently, the second vehicle needs to be in a receiving state only within a time range t1 of a time gap in any period, and does not need to be always in the long receiving state within the entire time gap. On the other hand, the radar device of the second vehicle determines to send a response message to the first vehicle within a time range of a time gap between two radar signals of the second vehicle. The time range may be referred to as a sending time range t2. The sending time range t2 and the sending time range t1 are totally staggered in time domain. That is, the second vehicle may change a sending time point of the response message of the second vehicle, to synchronize the response message with the communication message of the first vehicle in time domain. It may be understood that, after the second vehicle returns the response message to the first vehicle, the radar device of the first vehicle may also use the sending time range t2 as a receiving time range t2 of the first vehicle. In this way, after the synchronization information is exchanged and confirmed, the first vehicle and the second vehicle can implement communication synchronization. Duration of the sending time range t1 may be greater than, equal to, or less than that of the sending time range t2. In this way, after communication synchronization is completed, in any subsequent period, a start point and an end point of the receiving time range t1 of the second vehicle are aligned with those of the sending time range t1 of the first vehicle, and a start point and an end point of the sending time range t2 of the second vehicle are aligned with those of the receiving time range t2 of the first vehicle. Therefore, synchronization information no longer needs to be sent between the first vehicle and the second vehicle, and the first vehicle and the second vehicle can directly communicate with each other.

The first vehicle and the second vehicle may mutually receive, send, and confirm the synchronization information, to complete communication synchronization between the first vehicle and the second vehicle. Communication between the two vehicles can be implemented after communication sending and receiving windows of the two vehicles are aligned in a synchronization process. A process of performing time window alignment based on the synchronization information (where the synchronization information needs to be sent/received) may also be considered as an asynchronous communication process, and a process of performing mutual communication after the time window alignment (where the synchronization information no longer needs to be sent/received, and data may be directly sent or received) may also be considered as a synchronous communication process.

It may be learned that in this embodiment of the present disclosure, the first vehicle and the second vehicle may fully use their respective time gaps in real time to perform communication synchronization and to establish a communication link such that the vehicles can smoothly and coordinately complete communication interaction in a timely manner.

Based on the first aspect, in a possible implementation manner, the communication message exchanged between the two parties may be any communication short message service message. In a specific embodiment, a frame format of the communication message may include start information, synchronization information (or referred to as a synchronization header), service data, and end information, and optionally, further include verification information. That is, in the communication synchronization phase, the first communication message includes the first synchronization information and at least one of motion information of a target (an environmental target for short, for example, another vehicle or a pedestrian) in an environment, status information of the first vehicle, or a request for status information of the second vehicle. The motion information of the environmental target is used to indicate a motion status (such as a speed, a location, an angle, or an acceleration) of the environmental target. The motion information of the environmental target may be obtained by detecting a radar signal of the radar device of the first vehicle, or may be sent by another vehicle to the first vehicle. The status information of the first vehicle is used to indicate a driving status of the first vehicle, such as a vehicle speed, an acceleration, steering, or a location of the first vehicle. The request for the status information of the second vehicle indicates a request for at least one of a driving speed, an acceleration, the steering, and a location of the second vehicle. In addition, after communication synchronization is completed, in a mutual communication phase, the first communication message may not need to carry synchronization information, and only specific service communication content needs to be sent to the peer party. Through implementation of this embodiment of the present disclosure, the vehicles may determine motion statuses of the vehicles using communication short message service messages of each other, thereby meeting a requirement of advanced assisted driving or unmanned driving to some extent, improving practicability of the radar device, avoiding a traffic accident of a vehicle through message exchange, and improving vehicle driving safety.

According to a second aspect, an embodiment of the present disclosure provides a method for implementing radar-communication integration of a vehicle, which is described from a second vehicle side. The method includes receiving, by a radar device of a second vehicle using a receive antenna of the radar device, a first carrier signal that is sent by a first vehicle within a time gap between sending of radar signals in adjacent periods by the first vehicle, and demodulating, by the radar device, the first carrier signal to obtain a first communication message. Through implementation of this embodiment of the present disclosure, the second vehicle can correspondingly receive and demodulate the communication message sent by the first vehicle within the time gap between the radar signals in the adjacent periods, to complete transfer of a short message service message. It may be understood that the radar signal is a periodic signal. That is, a time gap between radar signals in every two adjacent periods of the first vehicle may be used to transfer a message, and the second vehicle may correspondingly receive and demodulate the communication message. Therefore, message transmission efficiency is high, and a message delay is relatively low, thereby meeting a requirement of advanced assisted driving or unmanned driving to some extent, and improving practicability of the radar device and user experience.

Based on the first aspect, in a specific embodiment, the first carrier signal is an FSK signal, and a structure of the radar device of the second vehicle may be consistent with a structure of a radar device of the first vehicle. To enable the first vehicle and the second vehicle to normally send and receive a communication short message service message, an operating frequency used for FSK modulation may be negotiated in advance. For example, FSK signals of both the first vehicle and the second vehicle are unified to 76.01 gigahertz (GHz), with a bandwidth limited within 10 megahertz (MHz). Certainly, the operating frequency/the bandwidth of the FSK signals that are unified through negotiation may alternatively be other values. This is not limited herein. In addition, the unified operating frequency/bandwidth of the FSK signals may alternatively be pre-configured in the radar devices of the first vehicle and the second vehicle. Because the radar devices of the first vehicle and the second vehicle have the unified operating frequency/bandwidth of the FSK signals, the second vehicle may demodulate the first carrier signal based on the operating frequency/the bandwidth to obtain the first communication message.

In addition, the radar device of the second vehicle may further obtain a second communication message used to reply to the first communication message, and modulate the second communication message into a second carrier signal, where an operating frequency of the second carrier signal is in an operating band of the radar device of the second vehicle. Then, the radar device of the second vehicle sends a radar signal, and sends the second carrier signal to the radar device of the first vehicle within a time gap between sending of a radar signal in a current period and sending of a radar signal in a next period.

Based on the second aspect, in a possible embodiment, to enable the first vehicle and the second vehicle to fully use time gaps of their respective radar devices to perform coordinated and orderly communication, a second receiving time range and a second sending time range are correspondingly configured in the radar device of the second vehicle. Further, the time gap of the first vehicle includes a first sending time range (namely, the foregoing sending time range t1) and a first receiving time range (namely, the foregoing receiving time range t2), and the time gap of the second vehicle includes a second receiving time range (namely, the foregoing receiving time range t1) and a second sending time range (namely, the foregoing sending time range t2). The first sending time range indicates a time window within which the radar device sends the first communication message within the time gap. The first receiving time range indicates a time window within which the radar device receives the second communication message of the second vehicle within the time gap. The second receiving time range indicates a time window within which the radar device receives the first carrier signal. The second sending time range indicates a time window within which the radar device sends, to the first vehicle, the second carrier signal used to reply to the first carrier signal. There is a fixed time interval between the first receiving time range and the first sending time range and between the second receiving time range and the second sending time range, and the fixed time interval is a positive number greater than or equal to 0. That is, the first vehicle and the second vehicle configure their respective sending time ranges and receiving time ranges, to avoid interference between communication messages and also avoid interference between a radar signal and a communication message such that the first vehicle and the second vehicle can smoothly and coordinately complete communication interaction in a timely manner.

In a specific embodiment, in a possible implementation, in a communication synchronization phase, the first communication message may carry first synchronization information. The first synchronization information is used to indicate a first sending time range, and the first sending time range indicates a time window within which the first vehicle sends the first carrier signal. The radar device of the second vehicle may perform a communication synchronization operation based on the first synchronization information. The operation process includes adjusting, by the radar device, the second receiving time range using an MCU of the radar device such that the second receiving time range is synchronized with the first sending time range, and duration of the second receiving time range is consistent with duration of the first sending time range. It can be learned that the second vehicle may receive the synchronization information of the first vehicle to align message sending and receiving time windows with the second vehicle such that a receiving window of the second vehicle is synchronized with a sending window of the first vehicle, and a communication synchronization process is implemented. This helps the vehicles smoothly and coordinately complete communication interaction in a timely manner subsequently.

During specific implementation, the second vehicle may determine a start time point and an end time point of the first sending time range of the first vehicle based on the synchronization information, set a start time point of the second receiving time range of the second vehicle to align with the start point of the first sending time range of the first vehicle, and set an end point of the second receiving time range of the second vehicle to align with the end point of the first sending time range of the first vehicle.

In a specific embodiment, in a possible implementation, receiving, by a radar device of a second vehicle, a first carrier signal of a radar device of a first vehicle includes receiving, by the radar device of the second vehicle, the first carrier signal of the radar device of the first vehicle within the second receiving time range. After the receive window is synchronized with the transmit window of the first vehicle, the second vehicle may receive a message through the receive window. This helps the vehicles smoothly and coordinately complete communication interaction in a timely manner.

In a specific embodiment, within the second sending time range, the radar device returns the second carrier signal to the first vehicle using a transmit antenna of the radar device, where the second carrier signal carries a second communication message used by the second vehicle to reply to the first communication message. In a specific embodiment, the second communication message may be used as a reply to the first communication message. A frame format of the second communication message may include start information, synchronization information (or referred to as a synchronization header), service data, and end information, and optionally, further include verification information. For example, in the communication synchronization phase, the second communication message includes the first synchronization information and at least one of motion information of a target (an environmental target for short, for example, another vehicle or a pedestrian) in an environment, status information of the second vehicle, a request for status information of the first vehicle, and the like. In addition, after communication synchronization is completed, in a mutual communication phase, the first communication message may not need to carry synchronization information, and only specific service communication content needs to be sent to the peer party. It can be learned that in this embodiment of the present disclosure, the first vehicle and the second vehicle may change a frame structure in real time to fully use their respective time gaps to perform communication synchronization and to establish a communication link such that the vehicles can smoothly and coordinately complete communication interaction in a timely manner.

In a specific embodiment, in a communication synchronization phase, the second communication message includes second synchronization information, and the second synchronization information is used to indicate the second sending time range such that the first vehicle adjusts, based on the second sending time range, a first receiving time range of the first vehicle keep synchronization with the second sending time range, where the first receiving time range indicates a time window within which the first vehicle receives the second carrier signal. It can be learned that the second vehicle may instruct, by sending the synchronization information, the first vehicle to align the message sending and receiving time windows such that a sending window of the second vehicle is synchronized with a receiving window of the first vehicle. This helps the vehicles smoothly and coordinately complete communication interaction in a timely manner.

Based on the radar devices of the first vehicle and the second vehicle, the following describes some specific application scenarios.

In an inter-vehicle communication scenario, the radar device described above is disposed in both the first vehicle and the second vehicle. Further, to establish communication with the second vehicle, after the first vehicle transmits a radar signal to detect the second vehicle, the first vehicle sends a communication message to the second vehicle within a time gap between two radar signals using the radar device (for example, a front-end radar device). After receiving the communication message, the second vehicle sends a response message of the communication message to the first vehicle within a time gap between two radar signals also using the radar device (for example, a rear-end radar device) of the second vehicle.

It can be learned that through implementation of this embodiment of the present disclosure, communication can be quickly established between vehicles after the vehicles discover each other using radars, thereby improving intelligence and safety of the vehicles.

In another inter-vehicle communication scenario, a detection target and a communication object of the first vehicle are different, and vehicle-mounted radars are disposed at both a front end and a rear end of the first vehicle. After detecting the target, the vehicle-mounted radar at the front end of the first vehicle uses motion information of the detection target as a communication message, and then sends the communication message to the second vehicle using the vehicle-mounted radar at the rear end of the first vehicle. Further, to establish communication with the second vehicle, after the first vehicle obtains the motion information of the target using the front-end radar device, the first vehicle sends the communication message to the second vehicle within a time gap between two radar signals using the rear-end radar device. Likewise, after a vehicle-mounted radar device at a front end of the second vehicle receives the communication message, a radar device at a rear end of the second vehicle can forward the communication message to another vehicle within a time gap between two radar signals.

It can be learned that through implementation of this embodiment of the present disclosure, a function of relaying a communication message with a low delay by a vehicle can be implemented. That is, the vehicle can locally intercept the communication message, or can relay and transfer the communication message. Forwarding the communication message to other vehicles in a cascaded manner (for example, sharing a communication message by a platooning fleet) helps improve vehicle driving safety, avoid a traffic accident of an unmanned vehicle, and improve practicability of a radar device and user experience.

According to a third aspect, an embodiment of the present disclosure provides a radar device. The radar device includes a CAN interface, an MCU, an MMIC, a transmit antenna, and a receive antenna. The MCU is connected to the CAN interface and the MMIC, and the MMIC is further connected to the transmit antenna and the receive antenna. The radar device may be applied to a first vehicle, and is configured to implement the method according to the first aspect.

Further, the CAN interface is configured to obtain a first communication message. The MMIC is configured to modulate the first communication message into a first carrier signal, where an operating frequency of the first carrier signal is in an operating band of the radar device of the first vehicle. The MMIC is further configured to generate a periodic radar signal. The transmit antenna is configured to send a periodic radar signal, and send the first carrier signal to a second vehicle within a time gap between sending of a radar signal in a current period and sending of a radar signal in a next period.

According to a fourth aspect, an embodiment of the present disclosure provides a radar device. The radar device includes an MCU, an MMIC, a transmit antenna, and a receive antenna. The MMIC is connected to the MCU, the transmit antenna, and the receive antenna. The radar device may be applied to a second vehicle, and is configured to implement the method according to the second aspect.

Further, the receive antenna is configured to receive a first carrier signal that is sent by a first vehicle within a time gap between sending of a radar signal in a current period and sending of a radar signal in a next period, where the first carrier signal carries first synchronization information, the first synchronization information is used to indicate a first sending time range, and the first sending time range indicates a time window within which the first vehicle sends the first carrier signal. The MMIC is configured to demodulate the first carrier signal to obtain the first synchronization information. The MCU is configured to perform a communication synchronization operation based on the first synchronization information.

According to a fifth aspect, an embodiment of the present disclosure provides a radar device, including a processor, a memory, and a transceiver, where the memory stores an instruction, and the processor executes the instruction in the memory to implement the method according to the first aspect.

According to a sixth aspect, an embodiment of the present disclosure provides a radar device, including a processor, a memory, and a transceiver, where the memory stores an instruction, and the processor executes the instruction in the memory to implement the method according to the second aspect.

According to a seventh aspect, an embodiment of the present disclosure provides a communications system. The system includes a radar device of a first vehicle and a radar device of a second vehicle. The radar device of the first vehicle is the radar device according to the third aspect, and the radar device of the second vehicle is the radar device according to the fourth aspect. Alternatively, the radar device of the first vehicle is the radar device according to the fifth aspect, and the radar device of the second vehicle is the radar device according to the sixth aspect.

According to an eighth aspect, an embodiment of the present disclosure provides a non-volatile computer-readable storage medium. The computer-readable storage medium is configured to store implementation code of the method according to the first aspect. When the program code is executed by a computing device, the computing device is configured to perform the method according to the first aspect.

According to a ninth aspect, an embodiment of the present disclosure provides another non-volatile computer-readable storage medium. The computer-readable storage medium is configured to store implementation code of the method according to the second aspect. When the program code is executed by a computing device, the user equipment is configured to perform the method according to the second aspect.

According to a tenth aspect, an embodiment of the present disclosure provides a computer program product. The computer program product includes a program instruction, when the computer program product is executed by a computing device, the controller performs the method according to the first aspect. The computer program product may be a software installation package. If the method provided in any one of the possible designs of the first aspect needs to be used, the computer program product may be downloaded and executed on a controller to implement the method according to the first aspect.

According to an eleventh aspect, an embodiment of the present disclosure provides another computer program product. The computer program product includes a program instruction, when the computer program product is executed by user equipment, the controller performs the method provided in any one of the possible designs of the second aspect. The computer program product may be a software installation package. If the method provided in any one of the possible designs of the second aspect needs to be used, the computer program product may be downloaded and executed on a controller to implement the method according to the second aspect.

It can be learned that, in the embodiments of the present disclosure, a radar device of a vehicle adds a communication soft channel within a time gap of radar baseband processing, and modulates a frequency of a communication short message service message within an operating band range of the radar such that the radar device not only can precisely sense and detect an environmental target but also can send/receive a communication short message service message to/from a target vehicle. In the embodiments of the present disclosure, an idle slot between radar signals (for example, chirp signals) can be effectively used. An FSK modulation signal is inserted between radar signal frames to implement a radar-communication integration function. Through implementation of the embodiments of the present disclosure, a vehicle and a target vehicle may change a frame structure in real time to fully use their respective time gaps to perform communication synchronization and to establish a communication link such that the vehicles can smoothly and coordinately complete communication interaction in a timely manner. In addition, in a signal frame structure provided in the embodiments of the present disclosure, a time gap in each period may be used to transfer a message. Therefore, message transmission efficiency is high, and a message delay is relatively low. In addition, in the embodiments of the present disclosure, message interception and low-delay relay may be further implemented to improve vehicle driving safety, avoid a traffic accident of a vehicle, meet a requirement of advanced assisted driving or unmanned driving, and improve practicability of a radar device and user experience.

BRIEF DESCRIPTION OF DRAWINGS

To describe the technical solutions in some of the embodiments of the present disclosure more clearly, the following describes the accompanying drawings for some of the embodiments of the present disclosure.

DESCRIPTION OF EMBODIMENTS

The embodiments of the present disclosure are described below with reference to the accompanying drawings in the embodiments of the present disclosure. Terms used in the implementation part of the present disclosure are merely intended to explain specific embodiments of the present disclosure, but are not intended to limit the present disclosure.

Figure 1:
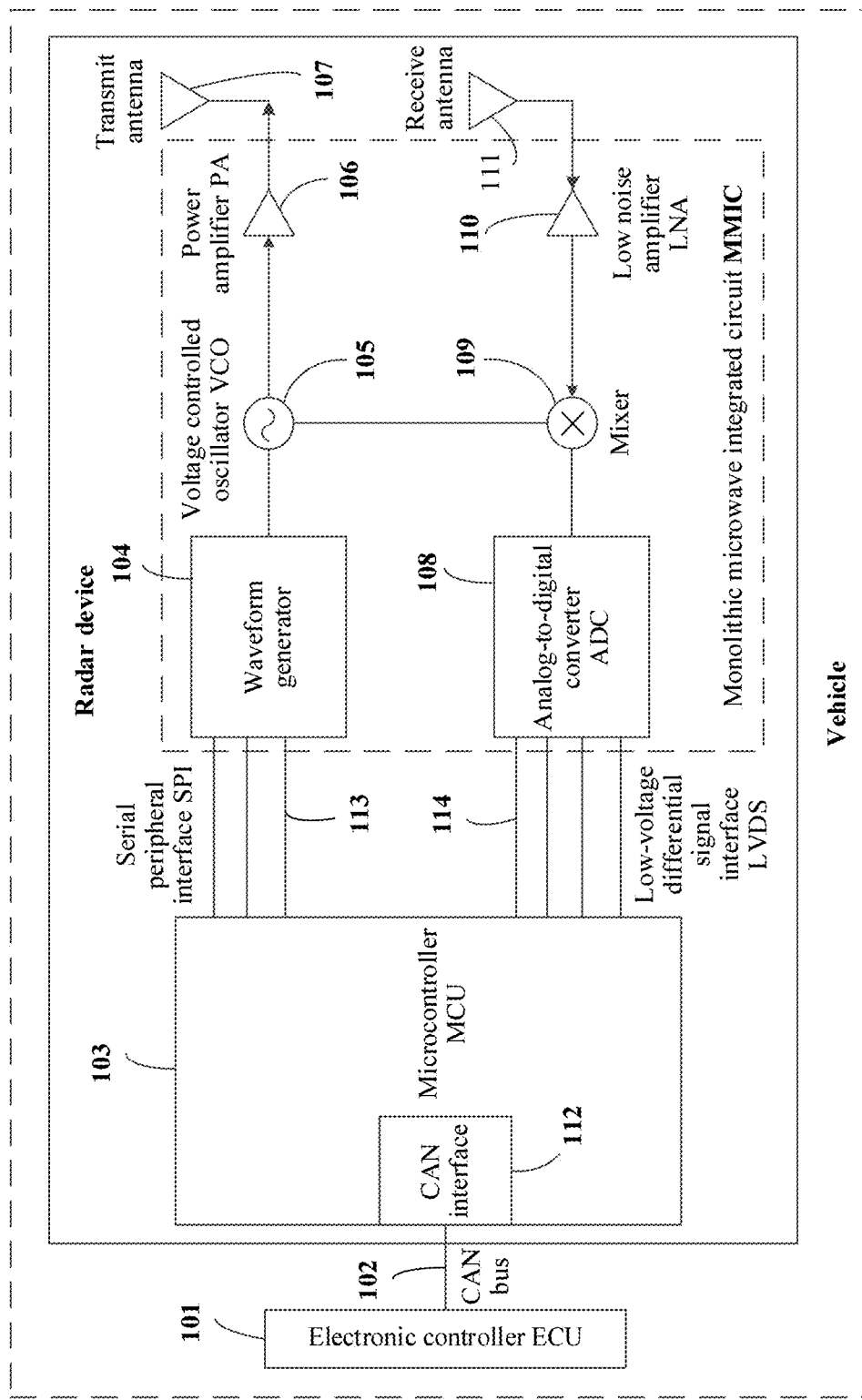
FIG. 1 is a schematic diagram of a device structure of a vehicle according to an embodiment of the present disclosure.

The embodiments of the present disclosure provide a vehicle-mounted radar device on which radar-communication integration is implemented. FIG. 1 is a schematic diagram of a device structure of a vehicle according to an embodiment of the present disclosure. Further, the device structure of the vehicle includes an electronic control unit (ECU) 101 and a radar device. The ECU 101 and the radar device may be connected using a CAN bus.

The ECU 101 is configured to obtain a message indicating that the vehicle needs to communicate with a target vehicle (that is a communication message), and send the communication message of the vehicle to the radar device using the CAN bus 102. For example, the communication message of the vehicle is status information such as a driving speed, an acceleration, a throttle, a steering angle, and mileage of the vehicle, a request message for status information of the target vehicle, or a message that is sent by another vehicle to the vehicle in advance and that needs to be forwarded by the vehicle to the target vehicle (namely, status information or a request message of the other vehicle). For another example, the communication message may further include synchronization information, where the synchronization information may be used by the target vehicle to implement subsequent communication synchronization.

The radar device includes an MCU 103, a transmit antenna (TX) 107, a receive antenna (RX) 111, and an MMIC. The MMIC may include a waveform generator 104, a voltage controlled oscillator (VCO) 105, a power amplifier (PA) 106, an analog-to-digital converter (ADC) 108, a mixer 109, a low noise amplifier (LNA) 110, and the like. The VCO 105 is connected to the waveform generator 104, the PA 106 and the mixer 109, and the mixer 109 is connected to the ADC 108, the LNA 110, and the VCO 105. The MCU 103 may be connected to the waveform generator in the MMIC through a Serial Peripheral Interface (SPI) 113, and the MCU 103 may be further connected to the ADC 108 in the MMIC through a low-voltage differential signal (LVDS) interface 114. The transmit antenna 107 may be connected to the PA 106 in the MMIC. The receive antenna 111 may be connected to the LNA 110 in the MMIC. The foregoing components in the radar device are described as follows.

A CAN interface 112 is disposed in the MCU 103, where the CAN interface 112 is connected to the CAN bus 102. Further, the MCU 103 may be configured to implement a baseband processing function of the radar, and may receive, through the CAN interface 112, a communication message sent by the ECU 101, encode the communication message, and set a signal waveform parameter (for example, set a frame length of a rectangular wave, and set a sending time range and a receiving time range that are described below). Further, the MCU 103 sends the communication message to the waveform generator 104 through the SPI 113.

On one hand, the waveform generator 104 is configured to generate a periodic radar signal (where the radar signal is, for example, a linear frequency modulation pulse signal chirp used for radar detection), where the radar signal is in a specific operating band range. For example, the operating band range is from 76 GHz to 81 GHz. On the other hand, the waveform generator 104 may be configured to generate a signal wave (for example, a rectangular wave) of the communication message, to modulate the communication message transmitted from the MCU 103. During specific implementation, the signal wave of the communication message may be modulated, through FSK, to an operating frequency (where for example, the operating frequency is 76.01 GHz) in the operating band range of the radar, where both the radar signal and the communication message that is modulated to the operating frequency may be millimeter wave radio frequency signals. During specific implementation, an FSK frequency modulation range depends on an intermediate frequency bandwidth (for example, an intermediate frequency bandwidth of 15 MHz) of the MMIC, and a frequency of FSK frequency modulation may be limited within the intermediate frequency bandwidth. A frequency offset of a reference clock and a maximum Doppler shift need to be considered for the frequency of the FSK frequency modulation. For example, a design requirement may be met based on an FSK frequency modulation change of 2 MHz. The waveform generator 104 may send, to the VCO 105, the radar signal and the communication message that is modulated to the operating frequency.

The VCO 105 is configured to modulate the radar signal into a high-frequency electrical signal, modulate the communication message that is at the operating frequency into a high-frequency electrical signal, input partial energy of the high-frequency electrical signals separately corresponding to the radar signal and the communication message into the mixer as a local-frequency signal, send the other energy to the PA 106 for power amplification, and then transmit, through the transmit antenna 107 (for example, a millimeter-wave antenna), the power-amplified radar signal and communication message out in an electromagnetic wave form. The radar signal is radiated to a target in an environment to detect the target in the environment. The target in the environment may be the target vehicle, or may be another vehicle or another moving object. The communication message is sent to the target vehicle to communicate with the target vehicle. That is, in this way, the vehicle not only can send the radar signal but also can send the communication message to the target vehicle.

The receive antenna 111 (for example, a millimeter-wave antenna) is configured to receive a radar signal reflected by the target in the environment, and further configured to receive a response of the target vehicle to the foregoing communication message (that is a response message, where it should be understood that the response message is also a communication message in essence). In this case, both the reflected radar signal and the response message of the target vehicle are high-frequency electrical signals. The receive antenna 111 transmits the reflected radar signal and the response message to the LNA 110 for amplification, and further, the LNA 110 inputs the radar signal and the response message to the mixer 109.

The mixer 109 is configured to perform frequency mixing (down-conversion) on the radar signal and the response message that are transmitted from the LNA 110 and a local-frequency signal that is sent by the VCO 105 in advance, to obtain intermediate frequency signals separately corresponding to the radar signal and the response message. After passing through a band-pass filter, the intermediate frequency signals are sent to the analog-to-digital converter ADC 108 for analog-to-digital conversion, and further are sent to the MCU 103 through the LVDS interface 114. The MCU 103 may be configured to demodulate the intermediate frequency signals. On one hand, the intermediate frequency signal corresponding to the radar signal is processed to obtain status information such as a distance, a driving speed, an angle, and an acceleration that are of the target in the environment relative to the vehicle. On the other hand, the response message may be processed. For example, when the response message carries synchronization information of the target vehicle, the MCU 103 may parse the response message to obtain the synchronization information, and further guide subsequent communication interaction between the vehicle and the target vehicle based on the synchronization information. For another example, the MCU 103 may send the response message to the ECU 101 through the CAN interface 112, and the ECU 101 parses the response message to obtain related data. That is, the vehicle not only can receive the radar signal to complete a radar detection function, but also can receive the response message sent by the target vehicle to complete communication interaction.

It should be noted that FIG. 1 is merely an implementation of the device structure of the vehicle in this embodiment of the present disclosure. During actual application, the device structure/the radar device of the vehicle may further include more or fewer components. This is not limited herein.

In this way, it can be learned that in this embodiment of the present disclosure, the radar device may be configured to implement radar-communication integration by operating the foregoing components of the radar device of the vehicle.

It should be understood that, in this embodiment of the present disclosure, a radar device similar to that of the vehicle may also be disposed on the target vehicle. That is, on one hand, the target vehicle may receive, using a receive antenna of the radar device of the target vehicle, the communication message sent by the vehicle, and transfer, using a related component, the communication message to an ECU of the target vehicle for processing, to obtain the response message of the communication message. On the other hand, the target vehicle may process the response message using a related component, and finally send the response message to the vehicle using a transmit antenna of the radar device, to complete an interactive communication process. For specific implementation, refer to the foregoing descriptions, and details are not described herein again.

In a specific application scenario, the radar device described in this embodiment of the present disclosure may be installed at a front end of the vehicle, to perform detection on and communication with a front environment of the vehicle, or the radar device described in this embodiment of the present disclosure may be installed at a rear end of the vehicle, to detect and communicate in a rear environment of the vehicle, or the radar device described in this embodiment of the present disclosure may be installed at both a front end and a rear end of the vehicle, to detect and communicate in both a front environment and a rear environment of the vehicle.

Based on the foregoing radar device, an embodiment of the present disclosure further provides a signal frame structure for implementing radar-communication integration. The signal frame structure provided in this embodiment of the present disclosure may change based on a communication requirement such that a radar detection mode is switched to a radar-communication integration mode.

Figure 2:
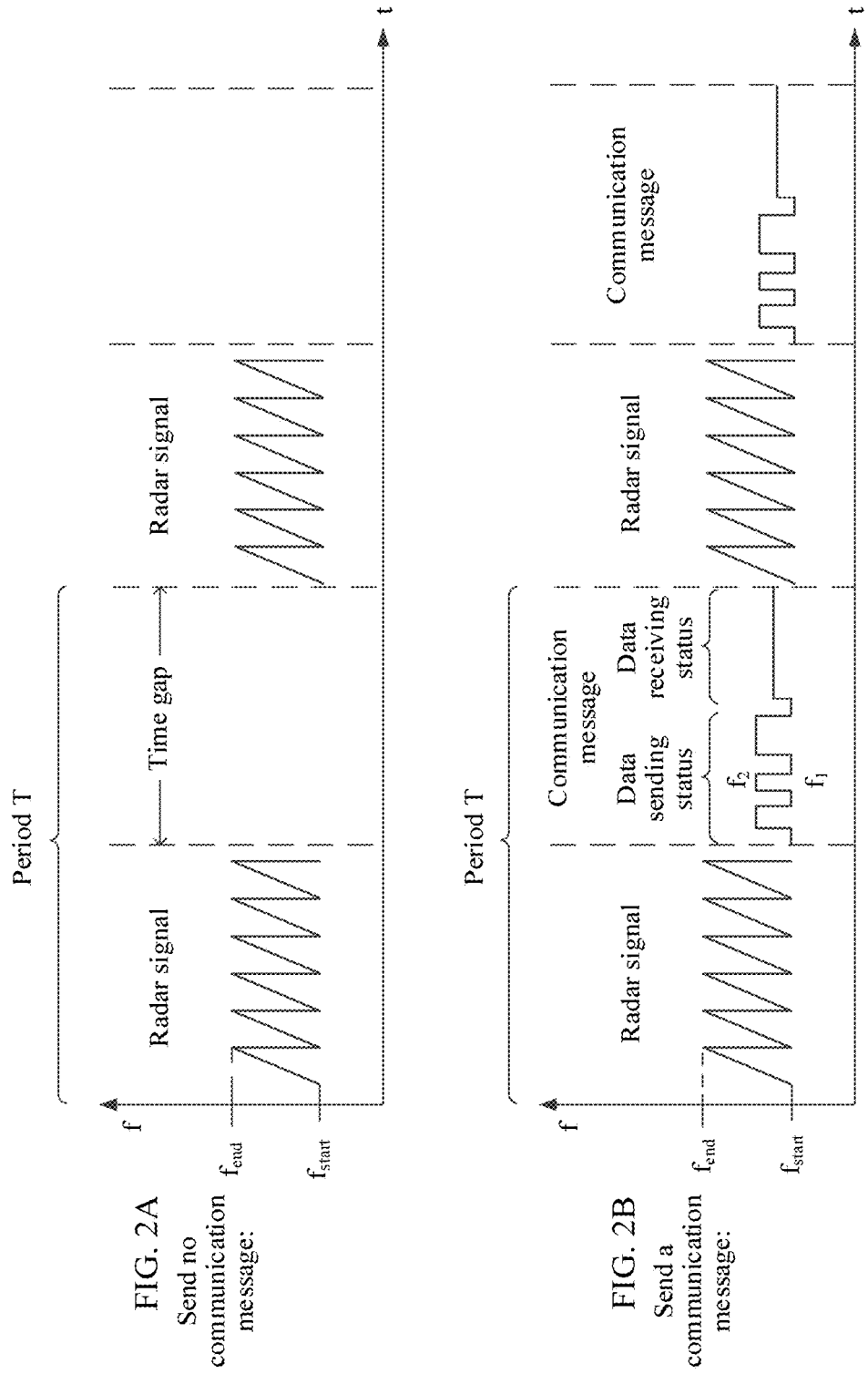
FIG. 2A and FIG. 2B are schematic diagrams of a periodic radar signal frame and a radar-communication integration frame according to an embodiment of the present disclosure.

As shown in FIG. 2A, in a specific application scenario, when a radar device of a vehicle works normally, and the vehicle does not need to send a communication message (that is, does not need to perform communication interaction), a signal frame structure includes a radar signal frame, a period of a radar signal is T, and the signal frame structure may be implemented in an MMIC of the radar device (for example, implemented in a waveform generator in the MMIC). To be specific, the radar device may periodically transmit the radar signal to the outside using a transmit antenna. For example, the radar signal is a chirp signal. The chirp signal may be a sawtooth wave in an FMCW modulation mode.

As shown in FIG. 2B, in another specific application scenario, when a radar device of a vehicle works normally, and the vehicle needs to send a communication message to (that is, needs to perform communication interaction with) a target vehicle, a communication message frame may be inserted within a gap between two periodic radar signal frames, to form a new signal frame structure. To be specific, the new signal frame structure includes a radar signal frame and a communication message frame that are alternately designed, and a period is T. The signal frame structure may also be implemented in an MMIC of the radar device. The radar device may transmit the communication message within a time gap between sending of a radar signal in a current period and sending of a radar signal in a next period (that is, between two radar signals). That is, a radar signal and a communication message may be successively sent within a period. For example, the radar signal is a chirp signal. The chirp signal may be a sawtooth wave in an FMCW modulation mode. Further, the communication message may be inserted after a tail frame of the radar signal in the current period (that is, after the last chirp sawtooth wave of the radar signal), and duration of the communication message may be adjusted based on an actual communication requirement. In one period T, duration (a frame length) of a communication message may be longer or shorter than duration (a frame length) of a radar signal. For example, if a period T is 20 milliseconds (ms), and duration of the radar signal frame is 10 ms, duration of the communication message frame may be defined as 3 ms. Certainly, this is merely an example instead of a limitation. It can be learned that, after the signal frame structure is changed to the new signal frame structure, an electromagnetic wave signal transmitted by the radar device to the outside using the transmit antenna of the radar device is a repetition of a combination of the two parts the radar signal and the communication message.

In both FIG. 2A and FIG. 2B, the radar signal is in a specific operating band range. For example, the operating band range ($f_{start}$, $f_{end}$) is from 76 GHz to 81 GHz. In FIG. 2B, a frequency of the communication message is modulated (for example, modulated through FSK) to an operating frequency in the operating band range of the radar signal. For example, the operating frequency is 76.01 GHz, and a bandwidth may be limited to 10 MHz (that is, f1 is 76.01

GHz and f2 is 76.02 GHz, as shown in the figure). Certainly, an operating band of the radar signal and the operating frequency/the bandwidth of the communication message may alternatively be other values. This is not limited herein. In this embodiment of the present disclosure, modulating the frequency of the communication message in the operating band range of the radar signal facilitates related processing and sending/receiving of the communication message by the radar device.

It should be noted that, if the communication message is relatively small, the radar device may transmit the entire communication message within one time gap between adjacent radar signals. If the communication message is relatively large, one time gap cannot support sending of the entire communication message. In this case, the communication message may be divided into a plurality of communication sub-messages, and the communication sub-messages may be sent separately within time gaps in different communication periods. In addition, in a possible embodiment, to ensure that a second vehicle can receive a communication message of a first vehicle, the communication message may alternatively be repeatedly sent in different communication periods. A quantity of repetitions is not limited herein.

It can be learned that in this embodiment of the present disclosure, a signal frame structure may be changed in real time based on a requirement, and a communication message may be inserted between radar signals such that a vehicle not only can retain a function of detecting an environmental target using radar but also can interact and communicate with a target vehicle. The two functions may be independently performed, and anti-interference performance of a signal is good. In addition, in a signal frame structure obtained after being changed, a time gap in each period may be used to transmit a message. Therefore, message transmission efficiency is high, and a message delay is relatively low. The signal frame structure with an alternated design in this embodiment of the present disclosure ensures compatibility between radar detection and communication functions, thereby implementing radar-communication integration of a radar device.

The following describes, using examples, several inter-vehicle communication scenarios in which radar-communication integration is implemented in the embodiments of the present disclosure.

Figure 3:
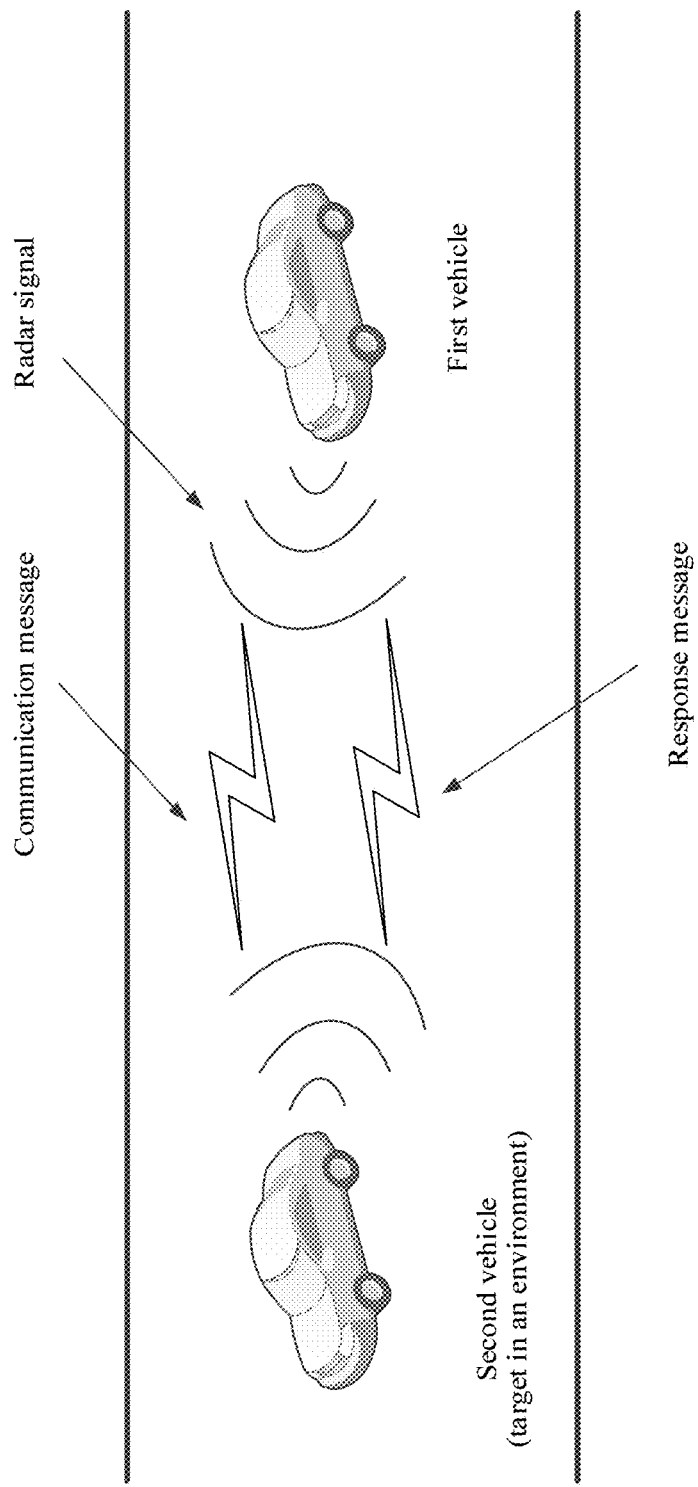
FIG. 3 is a schematic diagram of a scenario of communication between vehicles according to an embodiment of the present disclosure.

Referring to FIG. 3, in an inter-vehicle communication scenario, both a radar detection object and a communication object of a vehicle (which may be referred to as a first vehicle below) are a target vehicle (which may be referred to as a second vehicle below), and the radar device described above is disposed in both the first vehicle and the second vehicle. Further, to establish communication with the second vehicle, after the first vehicle transmits a radar signal to detect the second vehicle, the first vehicle sends a communication message to the second vehicle within a time gap between two radar signals using the radar device (for example, a front-end radar device). After receiving the communication message, the second vehicle sends a response message of the communication message to the first vehicle within a time gap between two radar signals also using the radar device (for example, a rear-end radar device) of the second vehicle.

It can be learned that through implementation of this embodiment of the present disclosure, communication can be quickly established between vehicles after the vehicles discover each other using radars, thereby improving intelligence and safety of the vehicles.

Referring to FIG. 3, in another inter-vehicle communication scenario, a detection target and a communication object of the first vehicle are different, and vehicle-mounted radars are disposed at both a front end and a rear end of the first vehicle. After detecting the target, the vehicle-mounted radar at the front end of the first vehicle uses motion information of the detection target as a communication message, then, the vehicle-mounted radar at the rear end of the first vehicle sends the communication message to the second vehicle. Further, to establish communication with the second vehicle, after the first vehicle obtains the motion information of the target using the front-end radar device, the first vehicle sends the communication message to the second vehicle within a time gap between two radar signals using the rear-end radar device. Likewise, after a vehicle-mounted radar device at a front end of the second vehicle receives the communication message, a radar device at a rear end of the second vehicle can forward the communication message to another vehicle within a time gap between two radar signals.

It can be learned that through implementation of this embodiment of the present disclosure, a function of relaying a communication message with a low delay by a vehicle can be implemented. That is, the vehicle can locally intercept the communication message, or can relay and transfer the communication message. Forwarding the communication message to other vehicles in a cascaded manner (for example, sharing a communication message by a platooning fleet) helps improve vehicle driving safety, avoid a traffic accident of an unmanned vehicle, and improve practicability of a radar device and user experience.

Based on the foregoing device structure and frame structure, the following further describes a method for implementing radar-communication integration of a vehicle provided in an embodiment of the present disclosure.

Figure 5:
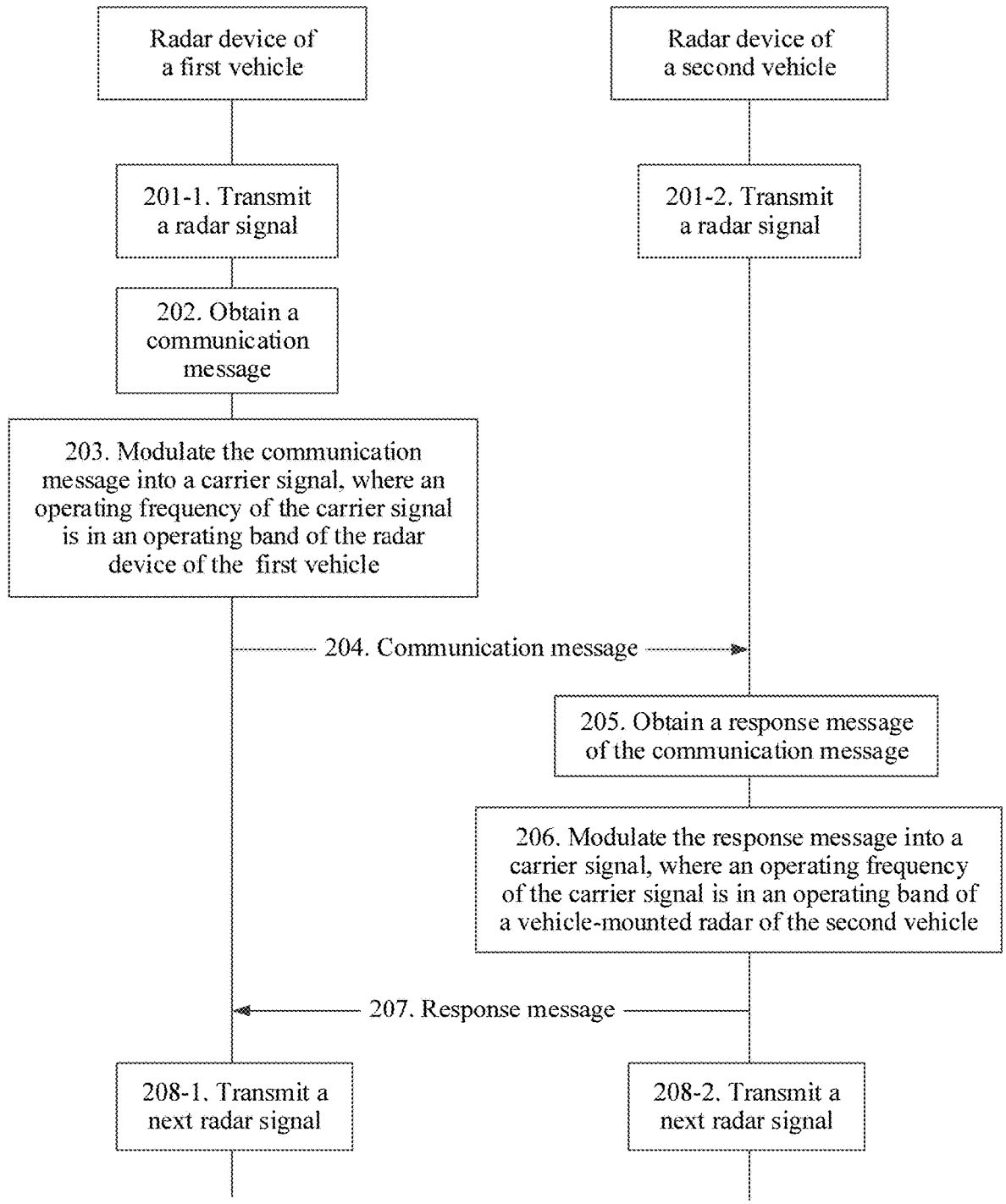
FIG. 5 is a schematic flowchart of a method for implementing radar-communication integration of a vehicle according to an embodiment of the present disclosure.

FIG. 5 is a schematic flowchart of a method for implementing radar-communication integration of a vehicle according to an embodiment of the present disclosure. Descriptions are provided from perspectives of both sides. The method includes but is not limited to the following steps.

Step S201-1 and step S201-2. A radar device of a first vehicle and a radar device of a second vehicle each transmit a radar signal during normal working, to detect a target in an environment.

In a possible application scenario, as described in the embodiment in FIG. 3, the first vehicle and the second vehicle each transmit a radar signal using their respective radar devices, to detect the peer party, and continue to perform a subsequent procedure after determining that the peer party is detected.

Figure 4:
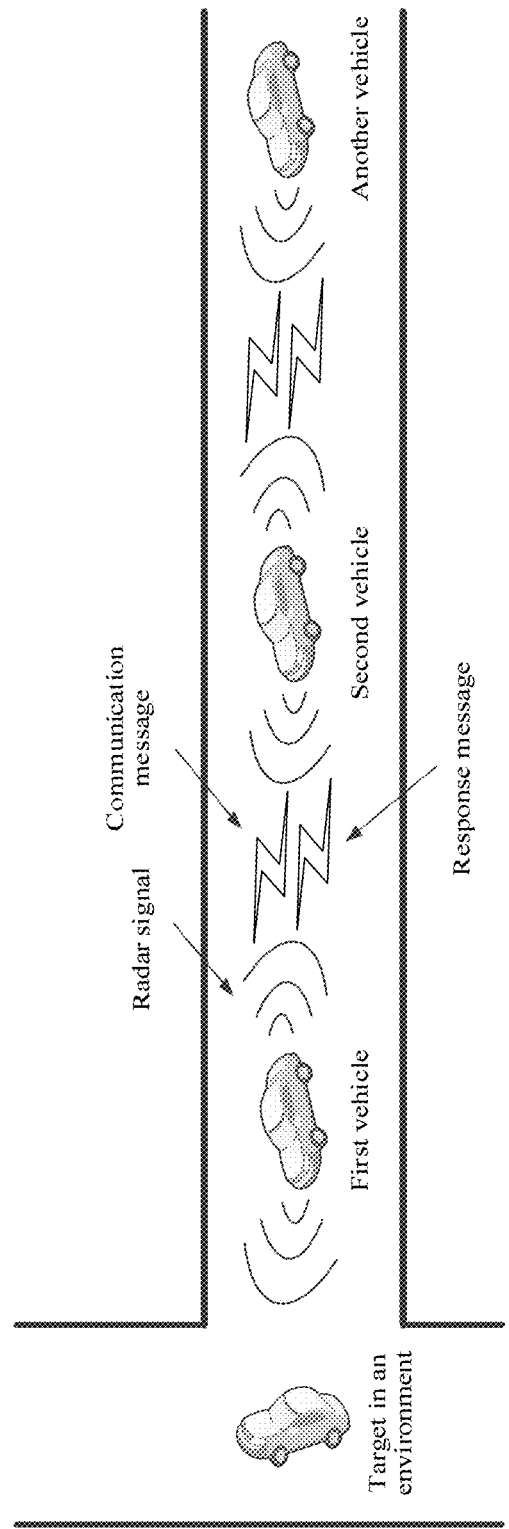
FIG. 4 is a schematic diagram of another scenario of communication between vehicles according to an embodiment of the present disclosure.

In a possible application scenario, as described in the embodiment in FIG. 4, the first vehicle may transmit a radar signal using the radar device at the front end of the first vehicle to detect the target in the environment, and the first vehicle may further transmit a radar signal using the radar device at the rear end of the first vehicle to detect the second vehicle. The second vehicle may also transmit a radar signal using the radar device at the front end of the second vehicle to detect the first vehicle, and the second vehicle may also transmit a radar signal using the radar device at the rear end of the second vehicle to detect another vehicle.

It should be noted that this embodiment of the present disclosure is not limited to the foregoing application scenarios. For example, the first vehicle or the second vehicle may further transmit a radar signal using the radar device thereof to detect a moving object such as a pedestrian, an animal, or a non-motor vehicle.

It should be further noted that, sending the radar signal by the radar device of the first vehicle and sending the radar signal by the radar device of the second vehicle are independent behavior. That is, a sequence of step S201-1 and step S201-2 is not limited.

Step S202. The radar device of the first vehicle obtains a communication message.

In a possible embodiment, the communication message may include status information of the first vehicle, where the status information is used to indicate a driving status of the first vehicle, for example, a vehicle speed, an acceleration, steering, or a location of the first vehicle. In a specific application, an ECU of the first vehicle may send the status information of the first vehicle to the radar device as the communication message.

In a possible embodiment, the communication message may include motion information of a target in an environment (that is an environmental target), where the motion information of the environmental target is used to indicate a motion status (such as a speed, a position, an angle, or an acceleration) of the environmental target. The motion information of the environmental target may be obtained through detection using the radar signal of the radar device of the first vehicle. For example, in the application scenario shown in FIG. 4, the first vehicle detects a front environmental target using the front-end radar device, to obtain motion information of the environmental target. Then, the front-end radar device sends the motion information of the environmental target to the rear-end radar device as the communication message.

In a possible embodiment, the communication message may include motion information of an environmental target. The motion information may be sent by another vehicle (for example, a vehicle ahead of the first vehicle) to the first vehicle, and the first vehicle inputs the motion information to the radar device as the communication message.

In a possible embodiment, the communication message in this embodiment of the present disclosure may further include both status information of the first vehicle and motion information of an environmental target.

It should be noted that the communication message in this embodiment of the present disclosure is not limited to the above forms, and may also be any other communication short message service message. For example, the communication message is a request for status information of the second vehicle, the communication message is a request for status information of another vehicle, or the communication message is a request for motion information of an environmental target.

Step S203. The radar device of the first vehicle modulates a communication frequency of the communication message to an operating frequency. The operating frequency is in an operating band of the radar device of the first vehicle.

In a specific embodiment, the first vehicle may modulate, through FSK, the communication message into a carrier signal that is at the operating frequency, that is, convert binary data into an FSK signal for transmission, where the frequency of the carrier signal is switched with an input bitstream change (where the FSK signal includes a high frequency and a low frequency, representing 1 and 0 in binary data).

In this embodiment of the present disclosure, the radar signal is in a specific operating band range. For example, the operating band range is from 76 GHz to 81 GHz. After the communication message is modulated into the FSK signal, the operating frequency of the communication message is in an operating band range of the radar. For example, the operating frequency is 76.01 GHz, and a bandwidth may be limited to 10 MHz (that is, a low frequency is 76.01 GHz, and a high frequency is 76.02 GHz). Certainly, an operating band of the radar and the operating frequency/the bandwidth of the FSK signal may alternatively be other values. This is not limited herein.

Step S204. The radar device of the first vehicle sends the communication message to the radar device of the second vehicle within a time gap between sending of the radar signal and sending of a next radar signal.

In a specific application, if the communication message is relatively small, the radar device may transmit the entire communication message within one time gap between adjacent radar signals. If the communication message is relatively large, one time gap cannot support sending of the entire communication message. In this case, the communication message may be divided into a plurality of communication sub-messages, and the communication sub-messages may be sent separately within time gaps in different communication periods. In addition, in a possible embodiment, to ensure that the second vehicle can receive the communication message of the first vehicle, the communication message may alternatively be repeatedly sent within a same time gap or within time gaps in different communication periods. A quantity of repetitions is not limited herein.

Step S205. After receiving the communication message, the radar device of the second vehicle further obtains a response message of the communication message.

In a specific embodiment, the radar device of the second vehicle may receive a carrier signal (an FSK signal) sent by the radar device of the first vehicle, where the carrier signal carries the communication message, and then demodulate the carrier signal to obtain the communication message.

In a specific embodiment, to enable the first vehicle and the second vehicle to normally send and receive a communication short message service message, an operating frequency used for FSK modulation may be negotiated in advance. For example, FSK signals of both the first vehicle and the second vehicle are unified to 76.01 GHz, with a bandwidth limited within 10 MHz. Certainly, the operating frequency/the bandwidth of the FSK signals that are unified through negotiation may alternatively be other values. This is not limited herein. In addition, the unified operating frequency/bandwidth of the FSK signals may alternatively be pre-configured in the radar devices of the first vehicle and the second vehicle. Because the radar devices of the first vehicle and the second vehicle have the unified operating frequency/bandwidth of the FSK signals, the second vehicle may demodulate the carrier signal based on the operating frequency/the bandwidth to obtain the communication message.

The radar device of the second vehicle generates the response message based on the communication message.

In a specific embodiment, the radar device of the second vehicle may transmit the communication message to an ECU of the second vehicle using a CAN bus, and the ECU generates the response message (where the response message is also a communication message in essence) based on the communication message, and uses the response message as a reply to the received communication message. For example, if the communication message is the status information of the first vehicle or the motion information of the environmental target, the response message may be an acknowledgment of a receiving status. For another example, if the communication message is the request for the status information of the second vehicle or the request for the motion information of the environmental target, the response message may be the status information of the second vehicle or the motion information of the environmental target. Further, the ECU of the second vehicle returns the response message to the radar device.

Step S206. The radar device of the second vehicle modulates a communication frequency of the response message to an operating frequency.

Similarly, in a specific embodiment, the radar device of the second vehicle may also modulate the response message into a carrier signal at the operating frequency through FSK. The operating frequency is in an operating band of the radar device of the second vehicle, and is consistent with the operating frequency of the FSK signal of the radar device of the first vehicle.

Step S207. The radar device of the second vehicle sends the response message to the radar device of the first vehicle within a time gap between sending of the radar signal and sending of a next radar signal (that is, between two radar signals). Correspondingly, the radar device of the first vehicle receives the response message.

Similarly, if the response message is relatively small, the radar device of the first vehicle may send the entire communication message within one time gap between adjacent radar signals. If the response message is relatively large, and one time gap cannot support sending of the entire response message, the response message may be divided into a plurality of communication sub-messages, and the communication sub-messages may be sent separately within time gaps in different communication periods. In addition, in a possible embodiment, to ensure that the first vehicle can receive the response message of the second vehicle, the response message may alternatively be repeatedly sent within time gaps in different communication periods. A quantity of repetitions is not limited herein.

Similarly, in a specific embodiment, the first vehicle receives the carrier signal (the FSK signal) returned by the radar device of the second vehicle. The carrier signal carries the response message. The radar device of the first vehicle and the radar device of the second vehicle have the unified operating frequency/bandwidth of the FSK signals, for example, from 76.01 GHz to 76.02 GHz. Therefore, the radar device of the first vehicle may set, based on the operating frequency/the bandwidth, an operating frequency for receiving the response message of the second vehicle, and demodulate the carrier signal to obtain the response message.

Step S208-1 and step S208-2. It may be understood that, because the radar signal is periodic, in a next communication period, the radar device of the first vehicle and the radar device of the second vehicle continue to transmit their respective next radar signals separately. It should be noted that, sending the next radar signal by the radar device of the first vehicle and sending the next radar signal by the radar device of the second vehicle are independent behavior. That is, a sequence of step S208-1 and step S208-2 is not limited.

It can be learned that, in this embodiment of the present disclosure, a radar device of a vehicle adds a communication soft channel within a time gap of radar baseband processing, and modulates a frequency of a communication short message service message within an operating band range of the radar such that the radar device not only can precisely sense and detect an environmental target but also can send/receive a communication short message service message to/from a target vehicle, thereby implementing radar-communication function integration. Through implementation of this embodiment of the present disclosure, an idle slot between chirp signals can be effectively used, and an FSK modulation signal is inserted between chirp signal frames. Based on robustness of FSK during demodulation, both a frequency jitter of a reference clock and a Doppler frequency jitter that is caused by different speeds of vehicles can be eliminated, and a relatively large frequency demodulation tolerance can be achieved within a limited intermediate frequency range. In addition, in a signal frame structure provided in this embodiment of the present disclosure, a time gap in each period may be used to transfer a message. Therefore, message transmission efficiency is high, and a message delay is relatively low. In addition, in this embodiment of the present disclosure, message interception and low-delay relay may be further implemented to improve vehicle driving safety, avoid a traffic accident of a vehicle, meet a requirement of advanced assisted driving or unmanned driving, and improve practicability of a radar device and user experience.

During actual application of this embodiment of the present disclosure, the first vehicle and the second vehicle may separately use radar devices with radar signals having different frame lengths or periods, the radar devices of the first vehicle and the second vehicle transmit radar signals at different moments, local clocks of the first vehicle and the second vehicle are inconsistent, or the like. In this embodiment of the present disclosure, to fully use a time gap between radar signals, avoid interference between a radar signal and a communication message, and ensure that the first vehicle and the second vehicle smoothly and coordinately complete communication interaction in a timely manner, the radar device of the second vehicle and/or the radar device of the first vehicle may further complete communication synchronization within the time gap between the radar signals based on synchronization information.

The synchronization information may be added to a communication message or a response message by a message sending end (for example, the first vehicle or the second vehicle) and sent to a message receiving end (for example, the second vehicle or the first vehicle). The message sending end may alternatively send the synchronization information to the message receiving end in another manner (for example, through separate sending). The synchronization information may be used to enable the message receiving end to keep clock frequency synchronization with the message sending end. On one hand, the synchronization information may be used to indicate a sending time of a communication frame signal (such as a communication message or a response message) to the message receiving end, and on the other hand, may be used to indicate, to the message receiving end, a clock pulse frequency for receiving the communication message, thereby implementing communication synchronization.

The following describes some communication synchronization processes that may be used in this embodiment of the present disclosure.

In this embodiment of the present disclosure, when communication interaction is not required, on one hand, the radar devices of the vehicles periodically send and receive radar signals, on the other hand, the radar devices of the vehicles are in a long receiving state for a communication message (where the long receiving state means that the radar device disables sending of a communication message and only receives a communication message from the outside). That is, the radar device of each vehicle is always ready to receive a communication message. When the first vehicle needs to communicate and interact with the second vehicle, the first vehicle first sends a communication message to the second vehicle within a time range of a time gap between two radar signals of the first vehicle. The time range may be referred to as a sending time range t1. Because the radar device of the second vehicle is still in the long receiving state, the radar device of the second vehicle always receives the communication message (where the communication message includes synchronization information). After receiving the communication message, on one hand, the radar device of the second vehicle confirms the sending time range t1 of the communication message based on the synchronization information, and uses the sending time range t1 as a receiving time range t1 of the second vehicle. That is, subsequently, the second vehicle needs to be in a receiving state only within a time range t1 of a time gap in any period, and does not need to be always in the long receiving state within the entire time gap. On the other hand, the radar device of the second vehicle determines to send a response message to the first vehicle within a time range of a time gap between two radar signals of the second vehicle. The time range may be referred to as a sending time range t2. The sending time range t2 and the sending time range t1 are totally staggered in time domain. That is, the second vehicle may change a sending time point of the response message of the second vehicle, to synchronize the response message with the communication message of the first vehicle in time domain. It may be understood that, after the second vehicle returns the response message to the first vehicle, the radar device of the first vehicle may also use the sending time range t2 as a receiving time range t2 of the first vehicle. In this way, after the synchronization information is exchanged and confirmed, the first vehicle and the second vehicle can implement communication synchronization. Duration of the sending time range t1 may be greater than, equal to, or less than that of the sending time range t2. In this way, after communication synchronization is completed, in any subsequent period, a start point and an end point of the receiving time range t1 of the second vehicle are aligned with those of the sending time range t1 of the first vehicle, and a start point and an end point of the sending time range t2 of the second vehicle are aligned with those of the receiving time range t2 of the first vehicle. Therefore, synchronization information no longer needs to be sent between the first vehicle and the second vehicle, and the first vehicle and the second vehicle can directly communicate with each other.

It should be noted that, in this embodiment of the present disclosure, the sending time range t1 indicates a time window that can be used by the first vehicle to send a message within a time gap between two radar signals of the first vehicle. The time window may exist within each time gap of the first vehicle that undergoes communication synchronization, and locations and duration of the time window within all time gaps are the same. The receiving time range t1 indicates a time window that can be used by the second vehicle to receive a message within a time gap between two radar signals of the second vehicle. The second vehicle aligns the receiving time range t1 with the sending time range t1 based on the synchronization information of the first vehicle. To be specific, the receiving time range t1 is synchronized with the sending time range t1 in time domain. Likewise, the sending time range t2 indicates a time window that can be used by the second vehicle to send a message within a time gap between two radar signals of the second vehicle. The time window may exist within each time gap of the second vehicle that undergoes communication synchronization, and locations and duration of the time window within all time gaps are the same. The receiving time range t2 indicates a time window that can be used by the first vehicle to receive a message within a time gap between two radar signals of the first vehicle. The first vehicle may align the receiving time range t2 with the sending time range t2 based on the synchronization information of the second vehicle, or may align the receiving time range t2 with the sending time range t2 according to a preset policy (for example, the receiving time range t2 follows the sending time range t1 at a fixed interval). To be specific, the receiving time range t2 is synchronized with the sending time range t2 in time domain.

Figure 6:
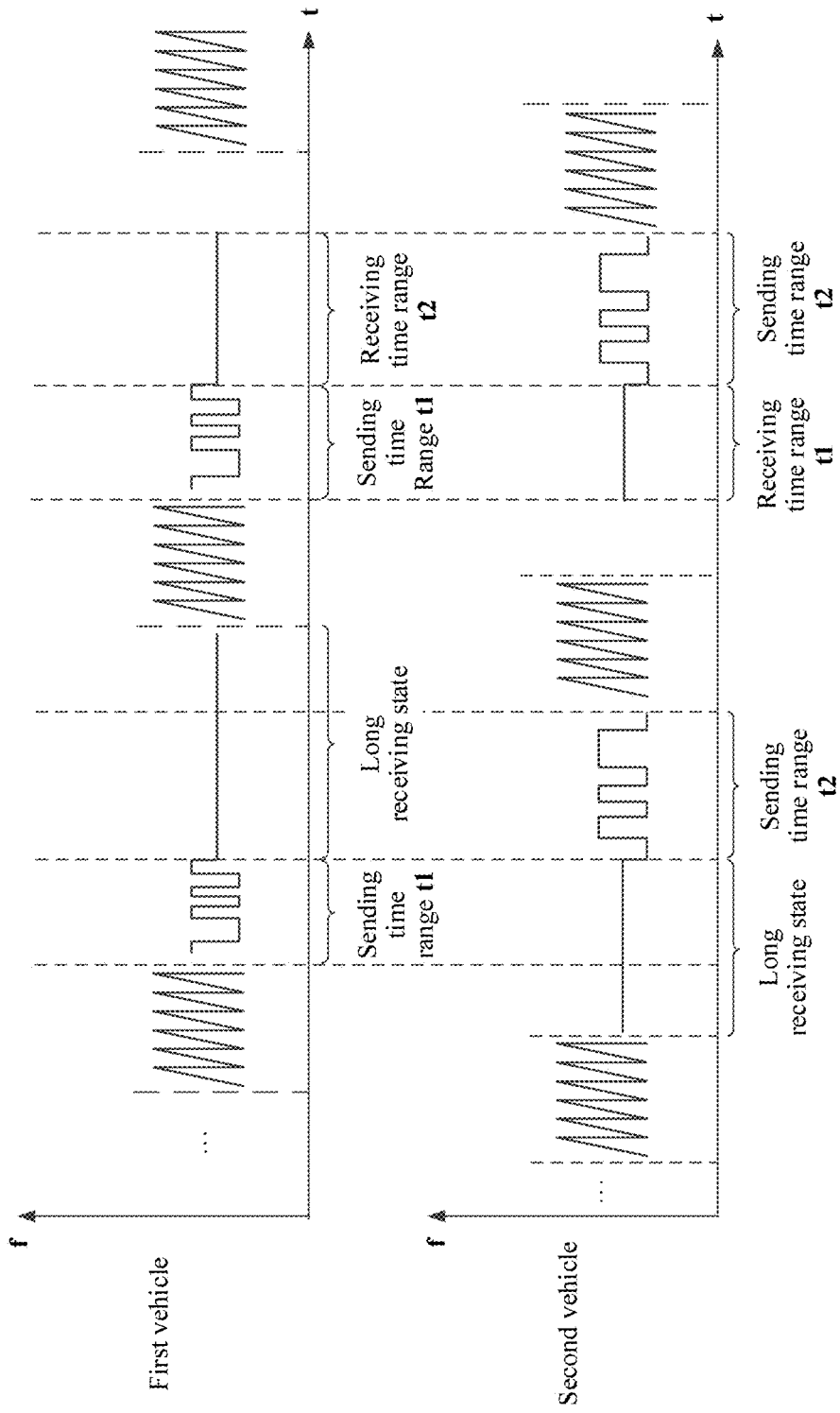
FIG. 6 is a schematic diagram of a scenario of communication synchronization between vehicles according to an embodiment of the present disclosure.

Referring to FIG. 6, in a specific embodiment, when the first vehicle needs to perform communication interaction with the second vehicle, a radar detection mode is switched to a radar-communication integration mode. The radar device of the first vehicle first sends a communication message (including synchronization information) to the second vehicle within a sending time range t1 of a time gap in a current period of the first vehicle. After the communication message is sent, the radar device of the first vehicle enters a long receiving state to wait for a response from the second vehicle. After receiving the communication message within a time gap in a current period of the radar device of the second vehicle, the radar device obtains the synchronization information in the communication message through parsing, determines the sending time range t1 based on the synchronization information, uses the sending time range t1 as a receiving time range t1 within a time gap in a subsequent period of the second vehicle, and ends a long receiving state in the current period of the second vehicle. The radar device of the second vehicle determines a sending time range t2 within a time gap between the current period and the subsequent period. The sending time range t2 and the sending time range t1 are totally staggered. The second vehicle returns a response message (including the synchronization information) to the first vehicle. The radar device of the first vehicle obtains the synchronization information in the response message through parsing, to determine the sending time range t2 of the second vehicle, and uses the sending time range t2 as a receiving time range t2 within a time gap in a subsequent period of the first vehicle. In this way, the first vehicle and the second vehicle can implement communication synchronization. That is, in the subsequent period (for example, a next period), t1 periodically exists within both a time gap of the first vehicle and a time gap of the second vehicle, thereby avoiding interference to radar information. t1 is a message sending time window of the first vehicle. Within the time range, the first vehicle may send or may not send a message. t1 is also a message receiving time window of the second vehicle. That is, the second vehicle can only receive a message but cannot send a message. Similarly, t2/t1 periodically exists within time gaps of the first vehicle and the second vehicle, thereby avoiding interference to the radar information. t2/t1 and t1 are totally staggered, and t2 is a message receiving time window of the first vehicle. Within the time range, the first vehicle can only receive a message but cannot send a message. t2 is also a message sending time window of the second vehicle, and the second vehicle may send or may not send a message.

Figure 7:
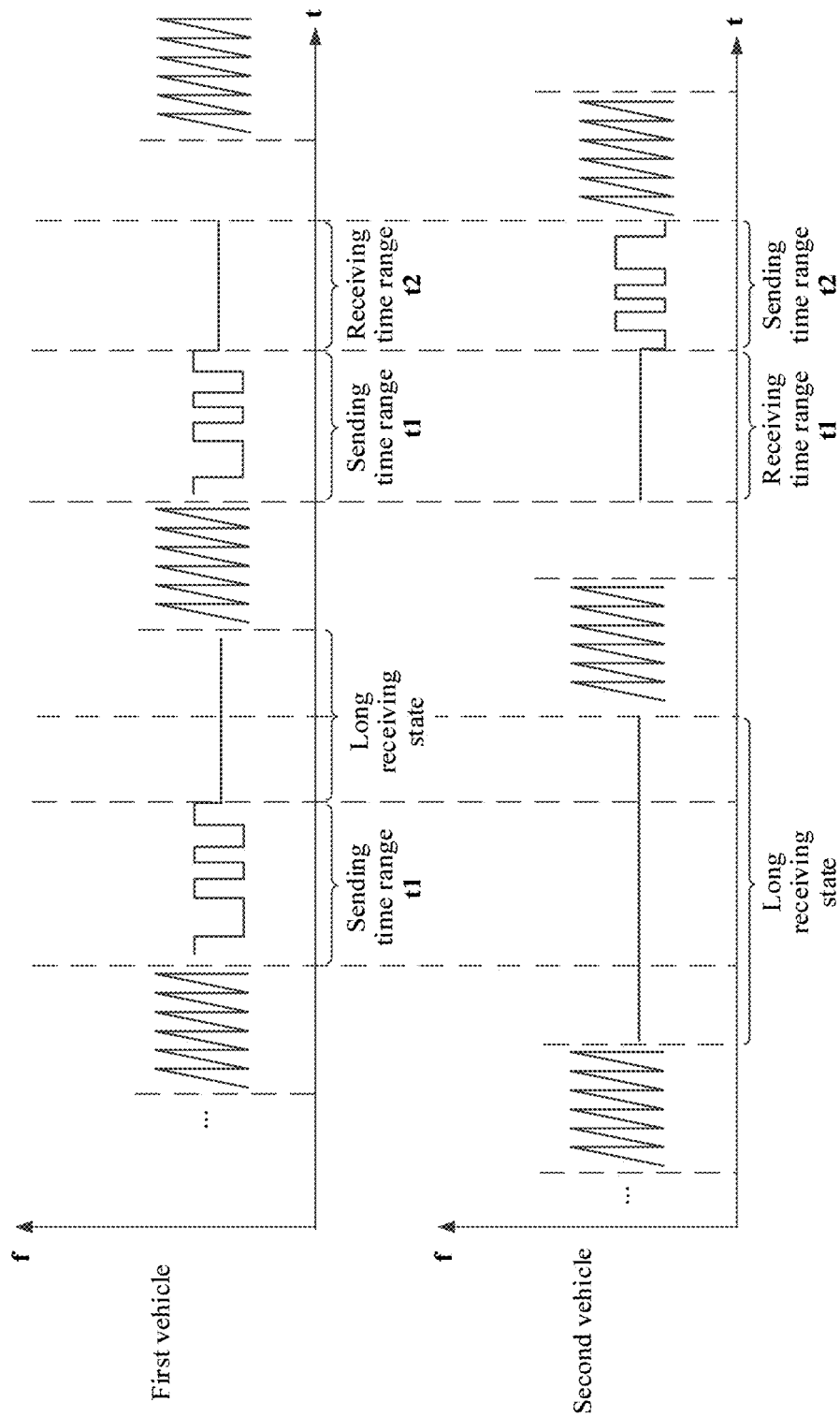
FIG. 7 is a schematic diagram of another scenario of communication synchronization between vehicles according to an embodiment of the present disclosure.

Referring to FIG. 7, in another specific embodiment, the first vehicle and the second vehicle negotiate duration of t1 and t2 in advance (or specific values of t1 and t2 are preconfigured in the first vehicle and the second vehicle), that is, predetermine duration of a sending time range t1 that can be used by the first vehicle to send a message and duration of a sending time range t2 that is used by the second vehicle to send a message. However, start time points of t1 and t2 within the time gaps are not necessarily determined. That is, an interval between a last chirp sawtooth wave of a radar signal and each of t1 and t2 is not determined. When the first vehicle needs to perform communication interaction with the second vehicle, a radar detection mode is switched to a radar-communication integration mode. The radar device of the first vehicle first sends, within a time gap in a current period of the first vehicle, a communication message to the second vehicle within duration t1 (that is, the sending time range t1) from any possible time point, where the communication message includes synchronization information. After the communication message is sent, the radar device of the first vehicle enters a long receiving state. The radar device of the second vehicle is always in a long receiving state within a time gap in a current period of the second vehicle, to ensure that no message needing to be received is missed. After obtaining the synchronization information in the communication message through parsing, the radar device of the second vehicle confirms the start time point of the sending time range t1 based on the synchronization information, and uses the sending time range t1 as a receiving time range t1 within a time gap in a subsequent period of the second vehicle. That is, in the subsequent period, the receiving time range t1 is always aligned with the sending time range t1. The radar device of the second vehicle determines the sending time range t2 within the time gap in the subsequent period. The sending time range t2 and the receiving time range t1 are totally staggered, and are connected in an end-to-end way (that is, the sending time range t2 is immediately switched to after the receiving time range t1 ends) or at a fixed interval. In this way, the first vehicle and the second vehicle complete communication synchronization, the first vehicle determines an interval between the sending time range t1 and a last chirp sawtooth wave of a radar signal of the first vehicle, and the second vehicle determines an interval between the receiving time range t1 and a last chirp sawtooth wave of a radar signal of the second vehicle. The second vehicle aligns the receiving time range t1 in the subsequent period with the sending time range t1, and duration of the receiving time range t1 is consistent with duration of the sending time range t1. The second vehicle aligns the sending time range t2 in the subsequent period with the receiving time range t2, and duration of the sending time range t2 is consistent with duration of the receiving time range t2. It may be understood that, in the subsequent period, the first vehicle sends a communication message to the second vehicle within the sending time range t1, where the communication message may not carry synchronization information, and only needs to carry actual service data (for example, vehicle status information or motion information of an environmental target). The second vehicle returns a response message (which may also not carry synchronization information) to the first vehicle within the sending time range t2. Sending and receiving processes are staggered with each other and do not interfere with each other, thereby completing communication interaction.

In the foregoing two embodiments, the first vehicle and the second vehicle may mutually receive, send, and confirm the synchronization information, and complete communication synchronization between the first vehicle and the second vehicle. Communication between the two vehicles can be implemented after communication sending and receiving windows of the two vehicles are aligned in a synchronization process. A process of performing time window alignment based on the synchronization information (where the synchronization information needs to be sent/received) may also be considered as an asynchronous communication process, and a process of performing mutual communication after the time window alignment (where the synchronization information no longer needs to be sent/received, and data may be directly sent or received) may also be considered as a synchronous communication process.

It should be noted that, in the implementation processes of the embodiments in FIG. 6 and FIG. 7, the radar signal and the communication signal are independent of each other. That is, only the communication message is synchronized, and the radar signal is not synchronized. This not only can be applied to a scenario in which radar devices of vehicles have consistent configurations but also can be applied to a scenario in which radar signals of vehicles have inconsistent frame lengths, periods, and the like. However, in some other possible application scenarios, for an application scenario in which radar devices of vehicles have consistent configurations (that is, frame lengths, periods, and the like of radar signals are all consistent), an embodiment of synchronizing radar signals of different vehicles may further be derived from the present disclosure.

Figure 8:
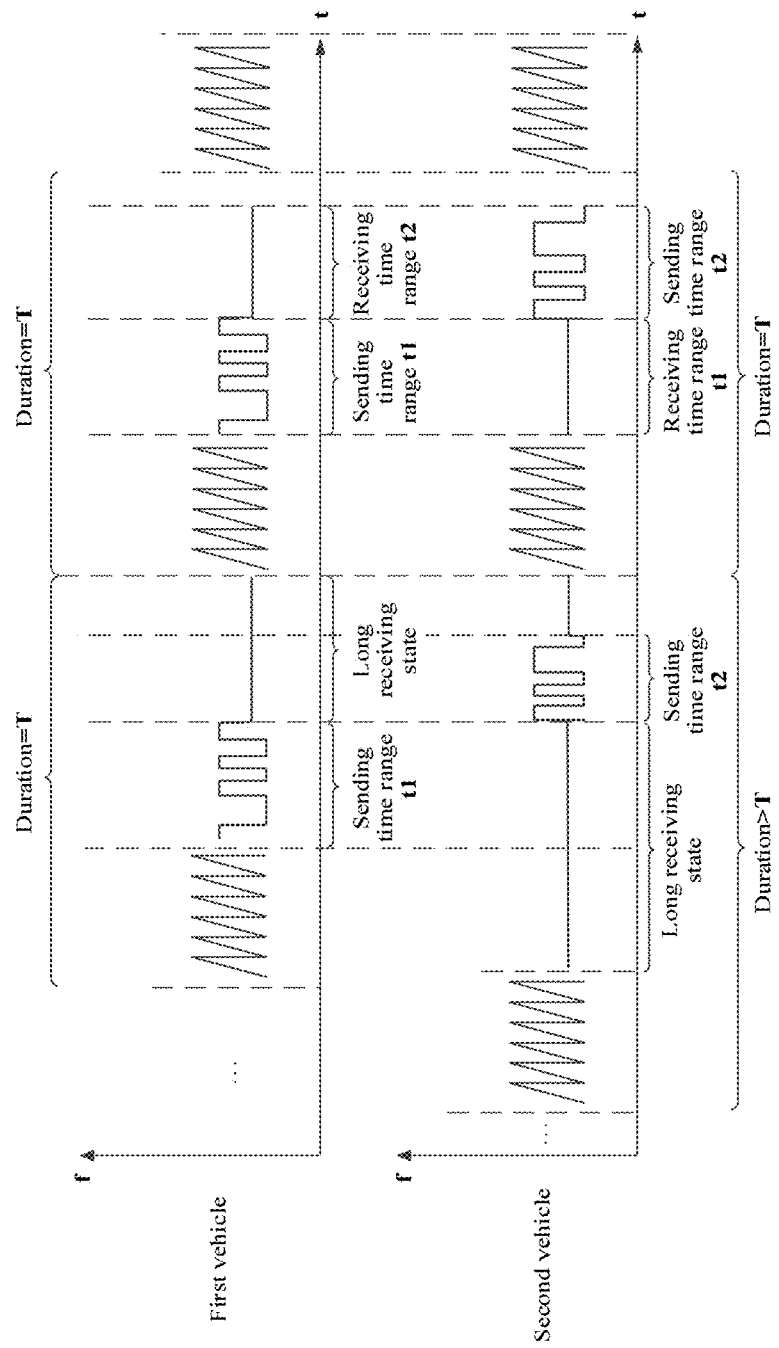
FIG. 8 is a schematic diagram of still another scenario of communication synchronization between vehicles according to an embodiment of the present disclosure.

Referring to FIG. 8, in a possible embodiment, the first vehicle needs to have a same radar signal frame length and a same period (T) as the radar device of the second vehicle, when the first vehicle needs to perform communication interaction with the second vehicle, a radar detection mode is switched to a radar-communication integration mode. The radar device of the first vehicle first sends a communication message (including synchronization information) to the second vehicle within a sending time range t1 at a fixed location within a time gap in a current period of the first vehicle (for example, a start point of the sending time range t1 immediately follows an end point of a last chirp sawtooth wave of a radar signal). After the communication message is sent, the radar device of the first vehicle enters a long receiving state to wait for a response from the second vehicle. After receiving the communication message within a time gap in a current period of the second vehicle, the radar device of the second vehicle obtains the synchronization information in the communication message through parsing, determines the sending time range t1 based on the synchronization information, uses the sending time range t1 as a receiving time range t1 in a subsequent period, and ends a long receiving state of the second vehicle in the current period. Because periods of radar signals of the first vehicle and the second vehicle are both T, the radar device of the second vehicle further confirms a transmission time point of a radar signal in a next period of the first vehicle, and uses the transmission time point as a transmission time point of a radar signal in a next period of the second vehicle. As shown in FIG. 7, in this application scenario, based on the transmission time point, duration of the time gap in the current period of the second vehicle is prolonged (that is, the duration of the current period is greater than T) such that a head and a tail of a next radar signal are aligned with those of a next radar signal of the first vehicle. The radar device of the second vehicle determines a sending time range t2 within a time gap between the current period and the subsequent period. The sending time range t2 and the sending time range t1 are totally staggered. The second vehicle returns a response message (including the synchronization information) to the first vehicle within the sending time range t2 within the time gap in the current period. The radar device of the first vehicle obtains the synchronization information in the response message through parsing, to determine the sending time range t2 of the second vehicle, and uses the sending time range t2 as a receiving time range t2 within a time gap in a subsequent period of the first vehicle. In this way, the first vehicle and the second vehicle can implement communication synchronization. In the subsequent period, the radars of the first vehicle and the second vehicle are synchronized, and message communication is also synchronized. The receiving time range t1 is aligned with the sending time range t1, and duration of the receiving time range t1 is consistent with duration of the sending time range t1. The sending time range t2 is aligned with the receiving time range t2, and duration of the sending time range t2 is consistent with duration of the receiving time range t2. Sending and receiving processes are staggered with each other and do not interfere with each other, thereby completing communication interaction.

Figure 9:
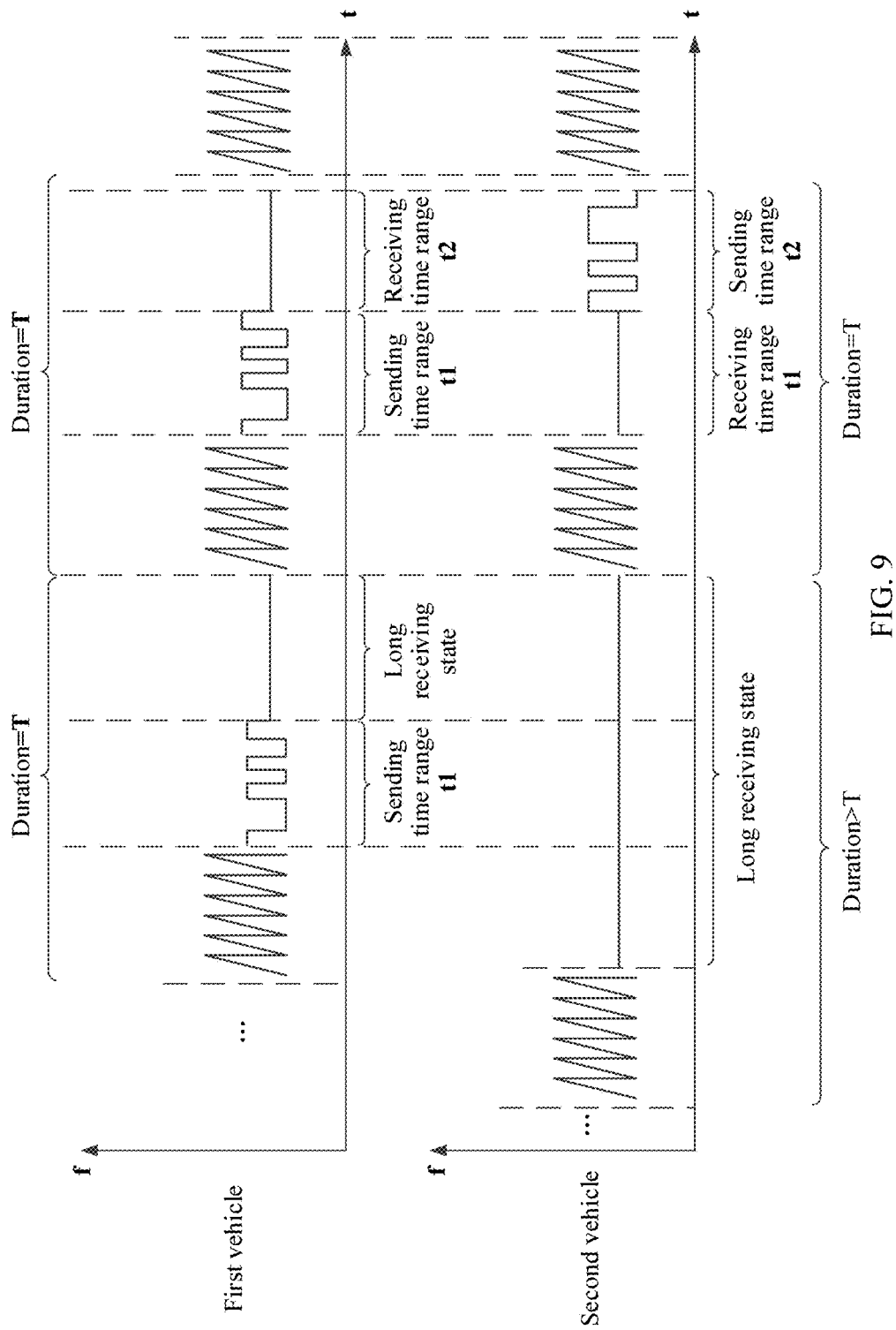
FIG. 9 is a schematic diagram of yet another scenario of communication synchronization between vehicles according to an embodiment of the present disclosure.

Referring to FIG. 9, in still another specific embodiment, the first vehicle and the second vehicle negotiate duration of t1 and t2 in advance (or specific values of t1 and t2 are pre-configured in the radar devices of the first vehicle and the second vehicle). The radar device of the first vehicle first sends a communication message (including synchronization information) to the second vehicle within a sending time range t1 at a fixed location within a time gap in a current period of the first vehicle (for example, a start point of the sending time range t1 immediately follows an end point of a last chirp sawtooth wave of a radar signal). After the communication message is sent, the radar device of the first vehicle enters a long receiving state. The radar device of the second vehicle is always in a long receiving state within a time gap in a current period of the second vehicle, to ensure that no message needing to be received is missed. After obtaining the synchronization information in the communication message through parsing, the radar device of the second vehicle confirms the sending time range t1 based on the synchronization information, and uses the sending time range t1 as a receiving time range t1 in a subsequent period. Because periods of radar signals of the first vehicle and the second vehicle are both T, the radar device of the second vehicle further confirms a transmission time point of a radar signal in a next period of the first vehicle, and uses the transmission time point as a transmission time point of a radar signal in a next period of the second vehicle. As shown in FIG. 8, in this application scenario, based on the transmission time point, duration of the time gap in the current period of the second vehicle is prolonged (that is, the duration of the current period is greater than T) such that a head and a tail of a next radar signal are aligned with those of a next radar signal of the first vehicle. The radar device of the second vehicle determines a sending time range t2 within a time gap in the subsequent period. In the subsequent period, the receiving time range t1 of the second vehicle is always aligned with the sending time range t1. The sending time range t2 and the receiving time range t1 are totally staggered, and are connected in an end-to-end way (that is, the sending time range t2 is immediately switched to after the receiving time range t1 ends) or at a fixed interval. A receiving time range t2 of the first vehicle and the sending time range t1 are also totally staggered, and are connected in an end-to-end way or at a fixed interval. That is, in the subsequent period, the radars of the first vehicle and the second vehicle are synchronized, and message communication is also synchronized. It may be understood that, in the subsequent period, the first vehicle sends a communication message to the second vehicle within the sending time range t1, and the communication message carries actual service data (for example, vehicle status information or motion information of an environmental target) of the first vehicle. The second vehicle may return a response message (which also carries actual service data of the second vehicle) to the first vehicle within the sending time range t2. Sending and receiving processes are staggered with each other and do not interfere with each other, thereby completing communication interaction.

In the foregoing two embodiments, the first vehicle and the second vehicle may align the radar signals based on the synchronization information to synchronize the radar signals, and may further complete communication synchronization between the first vehicle and the second vehicle based on the synchronization information. Communication between the two vehicles can be implemented after communication sending and receiving windows of the two vehicles are aligned in a synchronization process. A process of performing time window alignment based on the synchronization information (where the synchronization information needs to be received or sent) may also be considered as an asynchronous communication process, and a process of performing mutual communication after the time window alignment (where the synchronization information no longer needs to be sent or received, and data may be directly sent or received) may also be considered as a synchronous communication process.

Figure 10:
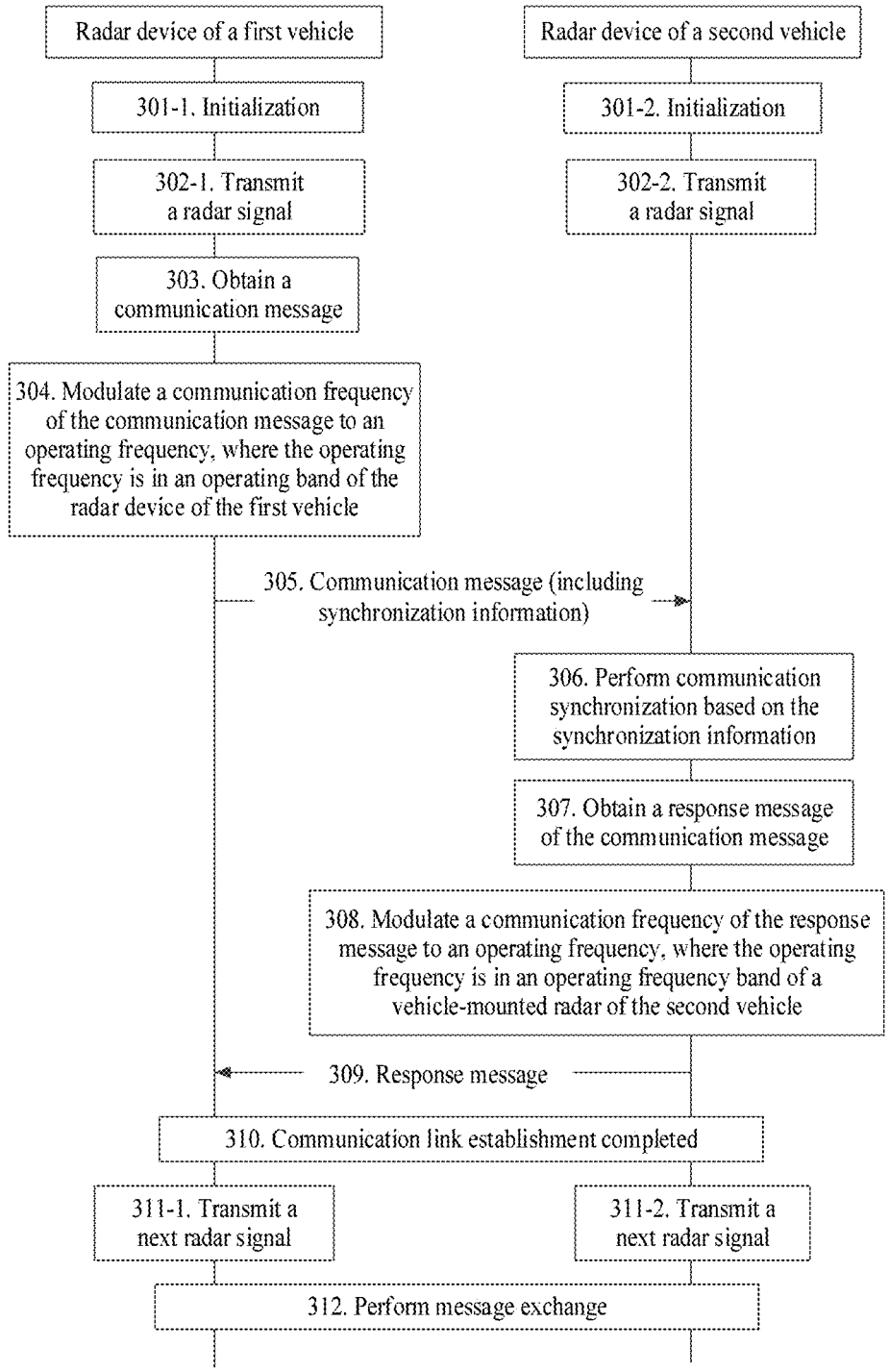
FIG. 10 is a schematic flowchart of another method for implementing radar-communication integration of a vehicle according to an embodiment of the present disclosure.

Based on the foregoing device structure, frame structure, and related communication synchronization manners, another method for implementing radar-communication integration of a vehicle provided in an embodiment of the present disclosure is further described below. FIG. 10 is a schematic flowchart of another method for implementing radar-communication integration of a vehicle according to an embodiment of the present disclosure. Descriptions are provided from perspectives of both sides. The method includes but is not limited to the following steps.

Step S301-1 and step 301-2. A radar device of a first vehicle and a radar device of a second vehicle each complete initialization of a communication integration function.

In a possible embodiment, a radar device may initiate a communication integration function after obtaining a communication short message service message. For example, the radar device of the first vehicle may perform initialization after receiving radar perception information and/or vehicle status information that are/is input by an ECU of the first vehicle. For another example, the radar device of the second vehicle may perform initialization after receiving a communication message sent by the first vehicle. In a possible embodiment, the radar device may alternatively initialize the communication integration function according to an operation instruction entered by a user (for example, a vehicle driver). In a possible embodiment, the radar device may alternatively initialize the communication integration function after startup and power-on.

In a specific embodiment, in the initialization process, the radar device may determine a frame structure of the radar device, an operating frequency/a bandwidth for mutual communication, a sending time range/a receiving time range within a time gap between radar signals, and the like.

For example, during initialization for a frame structure, the radar device determines a frame length, a period, a band range, and the like of a linear frequency modulation signal (a chirp signal) detected by a radar, and determines a modulation scheme of a communication frame signal (a communication message or a response message) inserted within a sending time range, and a frame format, a frame length, a repetition period, a frequency/frequency band, and the like of the communication frame signal.

For example, during initialization of the operating frequency/the bandwidth for mutual communication, a unified operating frequency/bandwidth is determined. For example, vehicles (the first vehicle and the second vehicle) perform negotiation in advance to unify an operating frequency for FSK modulation. For example, the operating frequency is unified to 76.01 GHz. That is, radar devices of different vehicles use a frequency band of 76.01 GHz to send FSK signals within time gaps between radar signals. The bandwidth is limited within 10 MHz (where any frequency band of 10 MHz in an operating band of the chirp signal may be used). For another example, the operating frequency/the bandwidth for mutual communication may be configured in a radar device. A same operating frequency/bandwidth for mutual communication is configured in radar devices used by different vehicles. For example, the operating frequency is unified to 76.04 GH, and a bandwidth is limited within 20 MHz. It may be understood that the foregoing example is merely used to explain the present disclosure rather than limit the present disclosure. In this embodiment of the present disclosure, an operating frequency/a bandwidth for mutual communication and unified by different vehicles may alternatively be other values.

It should be further noted that, in this embodiment of the present disclosure, frame lengths, periods, band ranges, and the like of radar signals (chirp signals) of radar devices of different vehicles may be the same or may be different. This is not limited herein.

It should be further noted that completing initialization by the radar device of the first vehicle and completing initialization by the radar device of the second vehicle are independent behavior. That is, a sequence of step S301-1 and step S301-2 is not limited.

Step S302-1 and step 302-2. The radar device of the first vehicle and the radar device of the second vehicle each transmit a radar signal during normal working, to detect a target in an environment. Refer to descriptions of step S201-1 and step S201-2 in the embodiment in FIG. 5, and details are not described herein again. It should be noted that, sending the radar signal by the radar device of the first vehicle and sending the radar signal by the radar device of the second vehicle are independent behavior. That is, a sequence of step S302-1 and step S302-2 is not limited.

Step S303. The radar device of the first vehicle obtains a communication message.

The first communication message includes at least one of motion information of an environmental target and status information of the first vehicle, and includes synchronization information. The motion information of the environmental target is used to indicate a motion status (such as a speed, a location, an angle, or an acceleration) of the environmental target. The motion information of the environmental target may be obtained by detecting the radar signal of the radar device of the first vehicle, or may be sent by another vehicle to the first vehicle. The status information of the first vehicle is used to indicate a driving status of the first vehicle, such as a vehicle speed, an acceleration, steering, or a location of the first vehicle. The synchronization information may be used to enable the second vehicle to keep clock frequency synchronization with the first vehicle. On one hand, the synchronization information may be used to indicate, to the second vehicle, a time of sending the communication message, on the other hand, the synchronization information may be used to indicate, to the second vehicle, a clock pulse frequency for receiving the communication message, to facilitate communication synchronization in step S306 described below.

Figure 11:
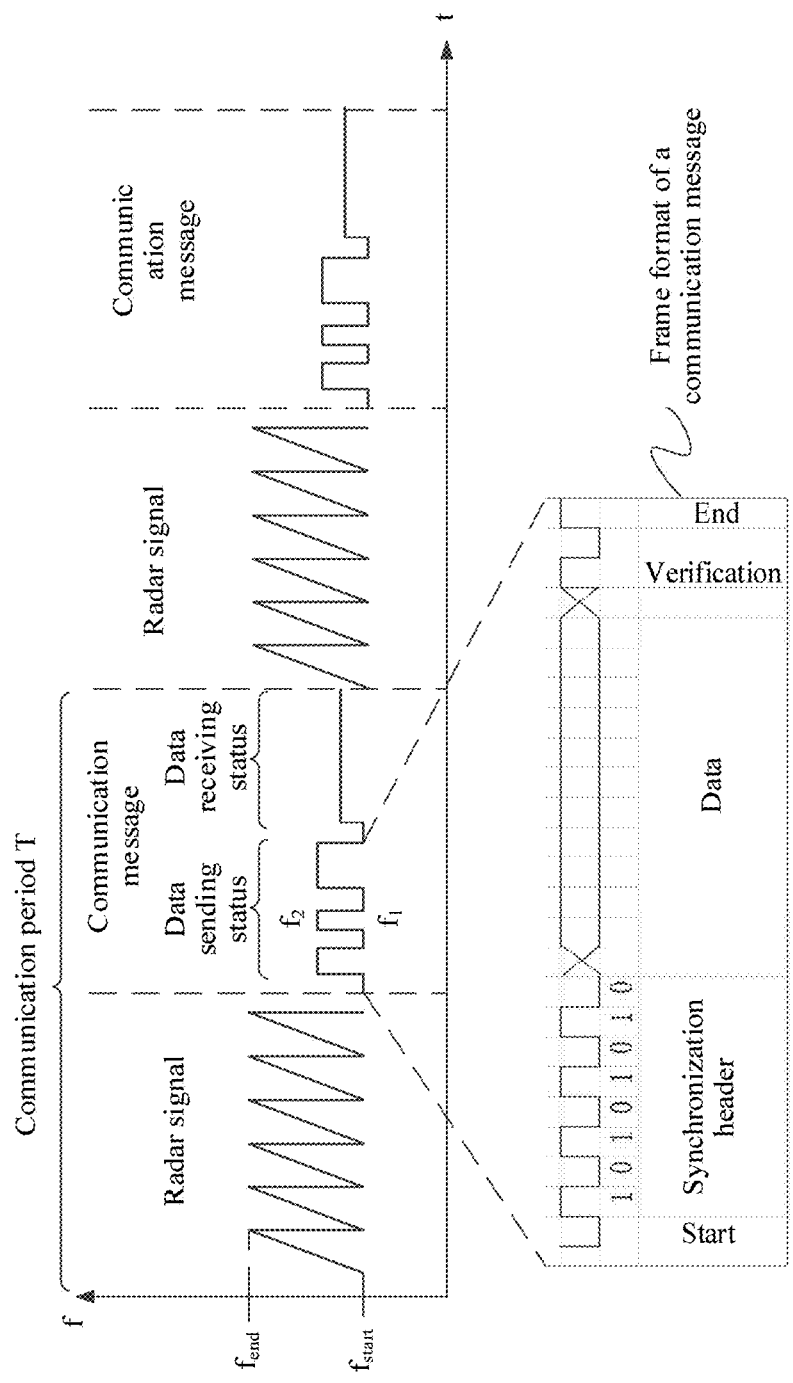
FIG. 11 is a schematic diagram of a frame structure of a communication message according to an embodiment of the present disclosure.
Figure 12A:
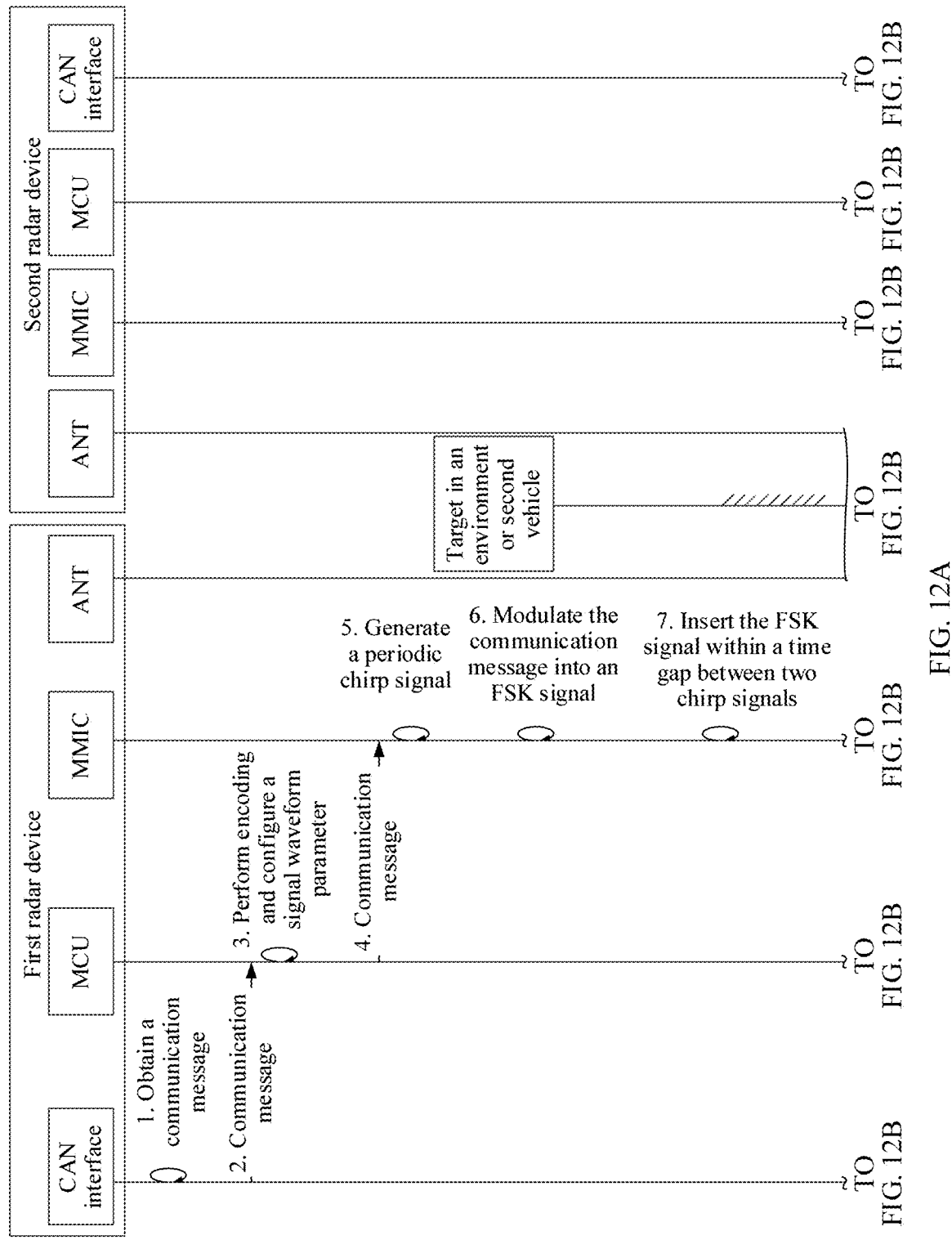
FIG. 12A, FIG. 12B, FIG. 12C, and FIG. 12D are a schematic diagram of a procedure of component cooperation between a first radar device and a second radar device according to an embodiment of the present disclosure.
Figure 12B:
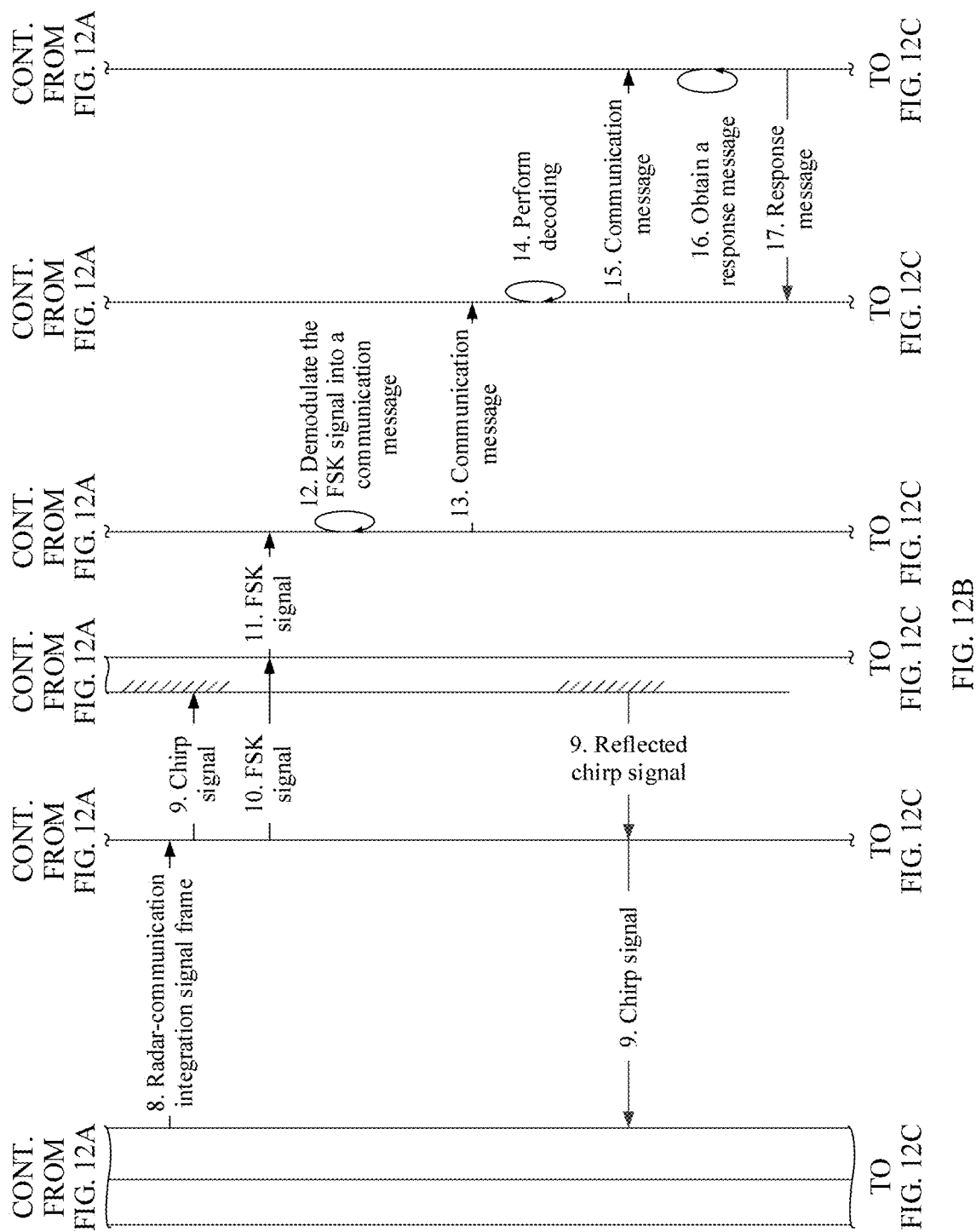
Figure 12C:
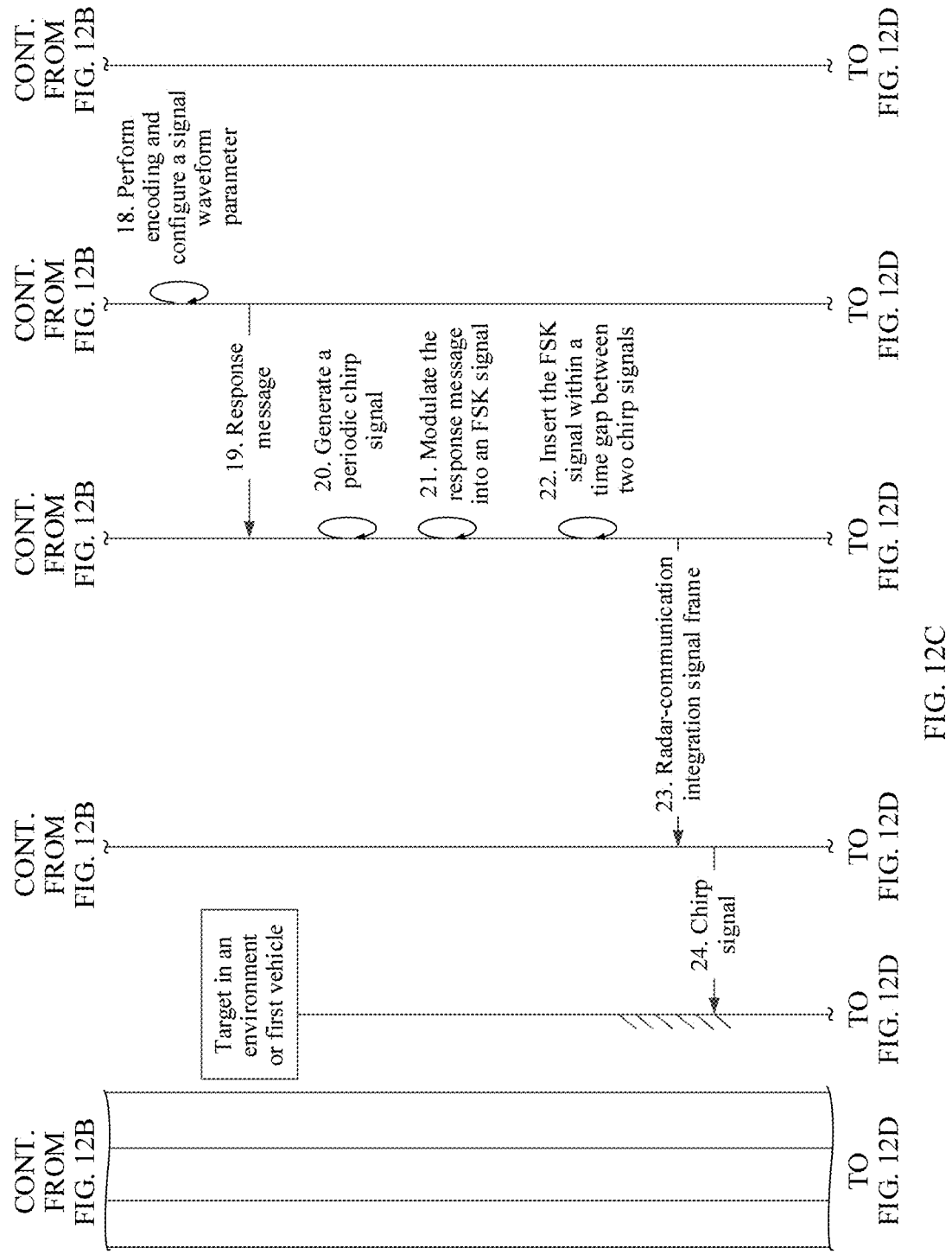
Figure 12D:
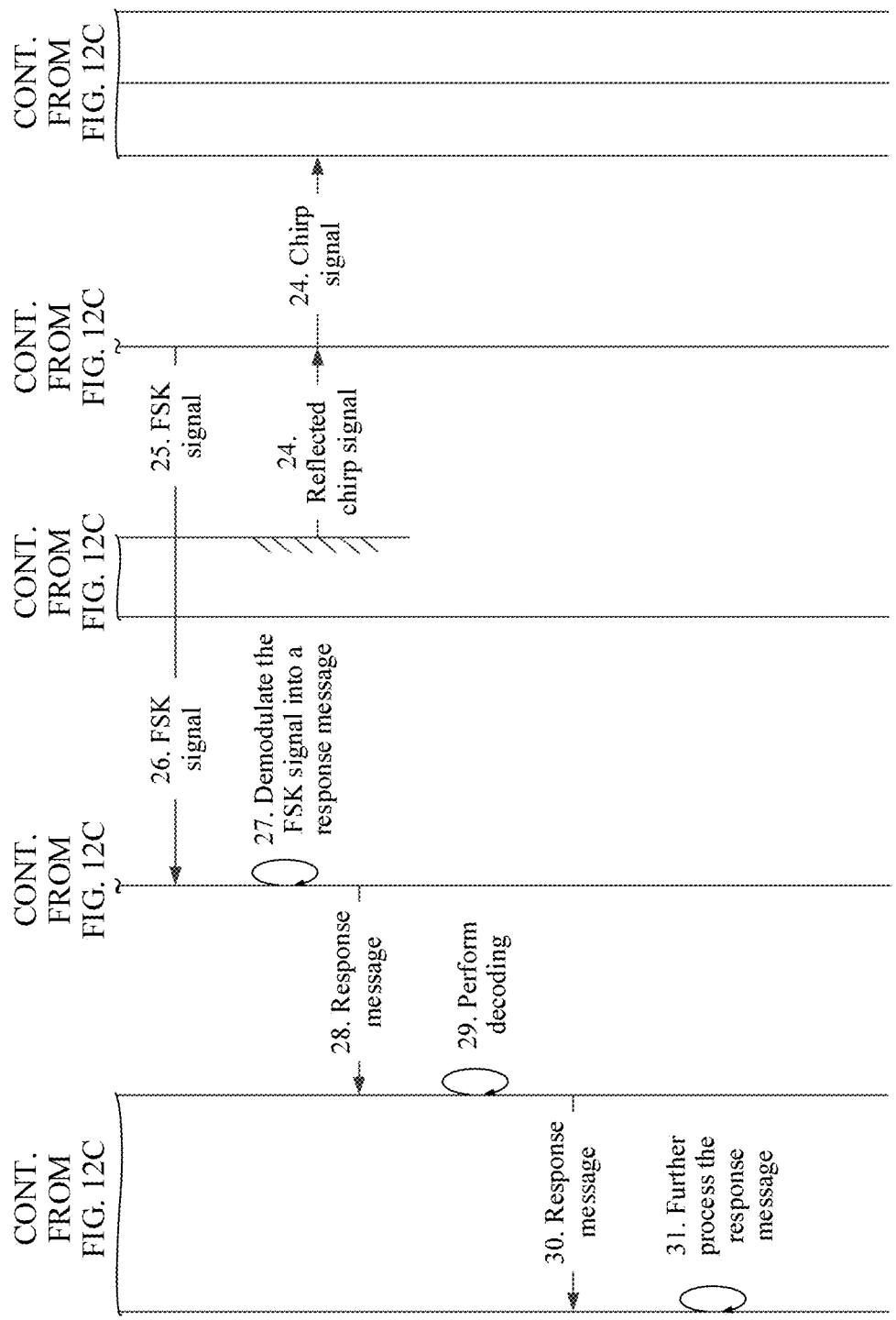

FIG. 11 shows a frame format of a communication message that needs to be sent within a time gap, where the communication message is sent within a time gap after a radar signal (a chirp signal) is sent. As shown in FIG. 11, in a specific embodiment, the frame format of the communication message may include start information, synchronization information (or referred to as a synchronization header), service data, and end information, and optionally, further include verification information.

The start information is used to indicate a start point of the communication message. For example, all "0" or all "1" may be used to indicate the start information. It should be understood that "0" and "1" herein actually correspond to an FSK signal transmitted by a radar device, where "0" indicates a low frequency of the FSK signal, and "1" indicates a high frequency of the FSK signal. For example, in an application scenario, the following may be defined: "0"=76.01 GHz, and "1"=76.02 GHz.

The synchronization information may be indicated using a sequence including a group of "0" and "1". For example, in the figure, the synchronization information is "10101010".

The service data is used to carry specific communication content. For example, the service data is status information of the first vehicle and motion information of an environmental target. For another example, the service data is a request for status information of the second vehicle, a request for status information of another vehicle, a request for motion information of an environmental target, and the like.

The verification information is used by the second vehicle to verify the communication message, for example, perform data integrity verification or data security verification.

The end information is used to indicate an end point of the communication message, and the end information is different from the start information. For example, when the start information is indicated by all "0", the end information may be indicated by all "1". When the start information is indicated by all "1", the end information may be indicated by all "0".

It should be understood that the frame format of the communication message in a possible embodiment of the present disclosure is not limited to the foregoing descriptions, and the communication message may include a larger or smaller amount of information than that in the foregoing descriptions in actual application. For example, in the communication message, an identifier (ID) of a vehicle (for example, an ID of the first vehicle or an ID of the second vehicle) may be further added after the synchronization information. For example, the communication message may not include the synchronization information, and the first vehicle may send the synchronization information to the second vehicle in another manner (for example, through separate sending) to implement synchronization. For another example, after each vehicle completes communication synchronization in the following step, the communication message may not include the synchronization information.

Step S304. The radar device of the first vehicle modulates a communication frequency of the communication message to an operating frequency. The operating frequency is in an operating band of the radar device of the first vehicle. For details, refer to the descriptions of step S503 in the embodiment in FIG. 5, and details are not described herein again.

Step S305. The radar device of the first vehicle sends the communication message to the radar device of the second vehicle within a sending time range (which may be briefly referred to as a first sending time range) within a time gap between two radar signals. Correspondingly, the radar device of the second vehicle receives the communication message.

In this embodiment of the present disclosure, when the first vehicle sends the communication message to the second vehicle within a time between two radar signals, the radar device of the second vehicle is in a long receiving state. Therefore, the second vehicle can certainly receive the communication message sent by the first vehicle.

In a specific application, if the communication message is relatively small, the radar device of the first vehicle may send the entire communication messages within one time gap between adjacent radar signals. If the communication message is relatively large, one time gap cannot support sending of the entire communication message. In this case, the communication message may be divided into a plurality of communication sub-messages, and the communication sub-messages may be sent separately within time gaps in different communication periods. In addition, in a possible embodiment, to ensure that the second vehicle can receive the communication message of the first vehicle, the communication message may alternatively be repeatedly sent within a same time gap or within time gaps in different communication periods. A quantity of repetitions is not limited herein.

For a detailed implementation process in which the first vehicle sends the communication message to the second vehicle, refer to related descriptions in the embodiments in FIG. 6 to FIG. 9, and details are not described herein again.

Step S306. The radar device of the second vehicle performs communication synchronization based on the synchronization information.

Further, the time gap of the first vehicle includes a first sending time range (namely, the foregoing sending time range t1) and a first receiving time range (namely, the foregoing receiving time range t2), and the time gap of the second vehicle includes a second receiving time range (namely, the foregoing receiving time range t1) and a second sending time range (namely, the foregoing sending time range t2).

The radar device of the second vehicle confirms the first sending time range of the first vehicle based on the synchronization information, to adjust the second receiving time range of the second vehicle to align with the first sending time range. That is, duration of the second receiving time range is consistent with duration of the first sending time range, and the second receiving time range is synchronized with the first sending time range. In addition, the second vehicle further confirms the second sending time range used by the second vehicle to send a message, and further adjusts the second sending time range to keep synchronization with the first sending time range (that is, synchronized with the second receiving time range) such that the second sending time range is adjusted and aligned with the first receiving time range. That is, duration of the second sending time range is consistent with duration of the first receiving time range, and the second sending time range is synchronized with the first receiving time range. In this way, the communication synchronization process is completed.

During specific implementation, the second vehicle may determine a start time point and an end time point of the first sending time range of the first vehicle based on the synchronization information, set a start time point of the second receiving time range of the second vehicle to align with the start point of the first sending time range of the first vehicle, and set an end point of the second receiving time range of the second vehicle to align with the end point of the first sending time range of the first vehicle.

For a specific implementation of the communication synchronization process in this embodiment of the present disclosure, refer to the descriptions in the embodiments in FIG. 6 to FIG. 9, and details are not described herein again.

Step S307. The radar device of the second vehicle obtains a response message of the communication message.

A frame format of the response message may also include start information, synchronization information (or referred to as a synchronization header), service data, and end information, and optionally, further include verification information. In addition, the response message may further include a larger or smaller amount of information than those described above. For a specific implementation process, refer to the descriptions of the frame format of the communication message.

In addition, for a specific implementation process of this step, refer to the descriptions of step S205 in the embodiment in FIG. 5, and details are not described herein again.

Step S308. The radar device of the second vehicle modulates a communication frequency of the second communication message to an operating frequency. The operating frequency is in an operating band of the radar device of the second vehicle. For details, refer to the descriptions of step S206 in the embodiment in FIG. 5, and details are not described herein again.

Step S309. The radar device of the second vehicle sends the response message to the radar device of the first vehicle within a second sending time range of a time gap between two radar signals. Correspondingly, the radar device of the first vehicle receives the response message. For a specific implementation process of this embodiment of the present disclosure, refer to the descriptions in the embodiments in FIG. 6 to FIG. 9, and details are not described herein again.

Step S310. The radar device of the first vehicle receives the response message, and confirms the response message. After the confirmation, the vehicles establish a communication link with each other.

In a specific embodiment, the first vehicle may determine a start time point and an end time point of the second sending time range of the second vehicle based on the synchronization information in the response message, set a start time point of the first receiving time range of the first vehicle to align with the start point of the second sending time range of the second vehicle, and set an end point of the first receiving time range of the first vehicle to align with the end point of the second sending time range of the second vehicle. For a specific process, also refer to the descriptions in the embodiments in FIG. 6 to FIG. 9, and details are not described herein again.

In a specific application scenario of the present disclosure, when the radar device of the first vehicle and the radar device of the second vehicle detect and track each other, both the radar device of the first vehicle and the second vehicle change to a radar-communication integration signal frame structure, a transmission frequency of the radar device of the first vehicle changes to a frequency (for example, 76.01 GHz) of the communication message. Then, communication information that needs to be sent is sent to the second vehicle after FSK modulation is performed on the communication information. In a long receiving process, the radar device of the second vehicle changes a receiving frequency to the frequency (for example, 76.01 GHz) of the communication message, and receives and parses the communication message and feeds back the response message. At the frequency, after the radar device of the first vehicle and the second vehicle complete communication synchronization with each other, the first vehicle confirms the first sending time range and the first receiving time range of the first vehicle, the second vehicle confirms the second sending time range and the second receiving time range of the second vehicle, the second receiving time range is always aligned with the first sending time range in time domain, and the first receiving time range is always aligned with the second sending time range in time domain. Therefore, a communication link is established between the first vehicle and the second vehicle.

In step S310, it may be understood that, because the radar signal is periodic, the radar device of the first vehicle and the radar device of the second vehicle continue to transmit radar signals separately in a next communication period.

Step S311-1 and step S311-2. In a subsequent communication period (including the next communication period), the first vehicle and the second vehicle transmit communication short message service messages (communication signal frames) with each other using the radar devices. It should be noted that, sending a next radar signal by the radar device of the first vehicle and sending a next radar signal by the radar device of the second vehicle are independent behavior. That is, a sequence of step S311-1 and step S311-2 is not limited.

Because the communication link has been established between the first vehicle and the second vehicle, before the communication link is disconnected, both vehicles do not need to send the synchronization information, but only send service data to each other. That is, within a first sending time range of any time gap in the subsequent period, the radar device of the first vehicle may send vehicle status information, motion information of an environmental target, a related response, a related request, and the like to the second vehicle through encoding, modulation, and other processes. Within a second sending time range of any time gap in the subsequent period, the radar device of the second vehicle may also send a related response, a related request, vehicle status information, motion information of an environmental target, and the like to the first vehicle through encoding, modulation, and other processes. That is, the first vehicle and the second vehicle transmit communication short message service messages to each other using their respective radar devices.

It should be noted that, in a possible embodiment of the present disclosure, after the vehicles mutually transmit the communication short message service messages, operating frequency ranges of the radar devices of the first vehicle and the second vehicle may be adjusted, or a waveform design of the communication signal frames may be adjusted, thereby further reducing interference of the radar signals of the vehicles to the communication signal frames.

It can be learned that, in this embodiment of the present disclosure, a radar device of a vehicle adds a communication soft channel within a time gap of radar baseband processing, and modulates a frequency of a communication short message service message within an operating band range of the radar such that the radar device not only can precisely sense and detect an environmental target but also can send/receive a communication short message service message to/from a target vehicle, thereby implementing radar-communication function integration. According to this embodiment of the present disclosure, an idle slot between chirp signals can be effectively used, and an FSK modulation signal is inserted between chirp signal frames. Based on robustness of FSK during demodulation, both a frequency jitter of a reference clock and a Doppler frequency jitter that is caused by different speeds of vehicles can be eliminated, and a relatively large frequency demodulation tolerance can be achieved within a limited intermediate frequency range. Through implementation of this embodiment of the present disclosure, a vehicle and a target vehicle may change a frame structure in real time, to fully use their respective time gaps to perform communication synchronization and to establish a communication link such that the vehicles can smoothly and coordinately complete communication interaction in a timely manner. In addition, in a signal frame structure provided in this embodiment of the present disclosure, a time gap in each period may be used to transfer a message. Therefore, message transmission efficiency is high, and a message delay is relatively low. In addition, in this embodiment of the present disclosure, message interception and low-delay relay may be further implemented to improve vehicle driving safety, avoid a traffic accident of a vehicle, meet a requirement of advanced assisted driving or unmanned driving, and improve practicability of a radar device and user experience.

The following uses the embodiment in FIG. 5 as an example to describe in detail a cooperation relationship between a related component in the radar device of the first vehicle (a first radar device for short) and a related component in the radar device of the second vehicle (a second radar device for short) in this embodiment of the present disclosure. Referring to FIG. 12A to FIG. 12D, detailed descriptions are as follows:

1. A CAN interface of the first radar device obtains a communication message. Further, the CAN interface of the first radar device obtains the communication message sent by an ECU of the first vehicle.

2. The CAN interface of the first radar device transmits the communication message to an MCU of the first radar device.

3. The MCU of the first radar device encodes the communication message, and configures a signal waveform parameter of the communication message.

4. The MCU of the first radar device sends an encoded communication message to an MMIC of the first radar device.

5 to 7. The MMIC of the first radar device generates a periodic chirp signal, modulates the communication message into an FSK signal (a carrier signal), and inserts the FSK signal within a time gap between two chirp signals, to form a radar-communication integration signal frame.

8. The MMIC of the first radar device sends the radar-communication integration signal frame to an antenna (ANT) (a transmit antenna) of the first radar device.

9 and 10. The ANT (the transmit antenna) of the first radar device, on one hand, transmits the chirp signals in the radar-communication integration signal frame to a target (or the second vehicle) in an environment, where it may be understood that the chirp signals are reflected after subsequently encountering the target (or the second vehicle) in the environment, and therefore are received by an ANT (a receive antenna) of the first radar device, and on the other hand, sends the FSK signal to an ANT (a receive antenna) of the second radar device.

11. The ANT (the receive antenna) of the second radar device transmits the FSK signal to an MMIC of the second radar device.

12. The MMIC of the second radar device demodulates the FSK signal into a communication message. Further, the MMIC of the second radar device has a communication frequency consistent with that of the MMIC of the first radar device, and the MMIC of the second radar device demodulates, based on the communication frequency, the FSK signal into the communication message.

13. The MMIC of the second radar device sends the communication message to an MCU of the second radar device.

14. The MCU of the second radar device decodes the communication message. In a possible embodiment, when a response message carries synchronization information, the MCU of the second radar device may further perform a communication synchronization operation based on the synchronization information such that a receiving time range of the second radar device is aligned with a sending time range of the first radar device.

15. The MCU of the second radar device sends a decoded communication message to a CAN interface of the second radar device.

16. The CAN interface of the second radar device further transmits the communication message to an ECU of the second vehicle. The ECU of the second vehicle generates a response message based on the communication message, and sends the response message to the CAN interface of the second radar device. That is, the CAN interface of the second radar device obtains the response message.

17. The CAN of the second radar device sends the response message to the MCU of the second radar device.

18. The MCU of the second radar device encodes the response message, and configures a signal waveform parameter of the response message.

19. The MCU of the second radar device sends an encoded response message to the MMIC of the second radar device.

20 to 22. The MMIC of the second radar device generates a periodic chirp signal, modulates the response message into an FSK signal (a carrier signal), and inserts the FSK signal within a time gap between two chirp signals, to form a radar-communication integration signal frame.

23. The MMIC of the second radar device sends the radar-communication integration signal frame to an ANT (a transmit antenna) of the second radar device.

24 and 25. The ANT (the transmit antenna) of the second radar device, on one hand, transmits the chirp signals in the radar-communication integration signal frame to a target (or the first vehicle) in the environment, where it may be understood that the chirp signals are reflected after subsequently encountering the target (or the second vehicle) in the environment, and therefore are received by the ANT (the receive antenna) of the second radar device, and on the other hand, sends the FSK signal to the ANT (the receive antenna) of the first radar device.

26. The ANT (the receive antenna) of the first radar device transmits the FSK signal to the MMIC of the first radar device.

27. The MMIC of the first radar device demodulates the FSK signal into a response message. Further, the MMIC of the first radar device has the communication frequency consistent with that of the MMIC of the second radar device, and the MMIC of the first radar device demodulates the FSK signal into the response message based on the communication frequency.

28. The MMIC of the first radar device transmits the response message to the MCU of the first radar device.

29. The MCU of the first radar device decodes the response message. In a possible embodiment, when the response message carries synchronization information, the MCU of the first radar device may further perform a communication synchronization operation based on the synchronization information such that a receiving time range of the first radar device is aligned with a sending time range of the second radar device.

30. The MCU of the first radar device transmits a decoded response message to the CAN interface of the first radar device.

31. The CAN interface of the first radar device further processes the response message. Further, the CAN interface of the first radar device sends the response message to the ECU of the first radar device, to complete communication interaction between the first vehicle and the second vehicle.

For a specific implementation process of the foregoing embodiment in FIG. 12A to FIG. 12D, refer to the foregoing related descriptions, and details are not described herein again.

The foregoing describes in detail the radar device and the related method in the embodiments of the present disclosure. Based on the same concept, the following continues to provide other apparatuses of the present disclosure.

Figure 13:
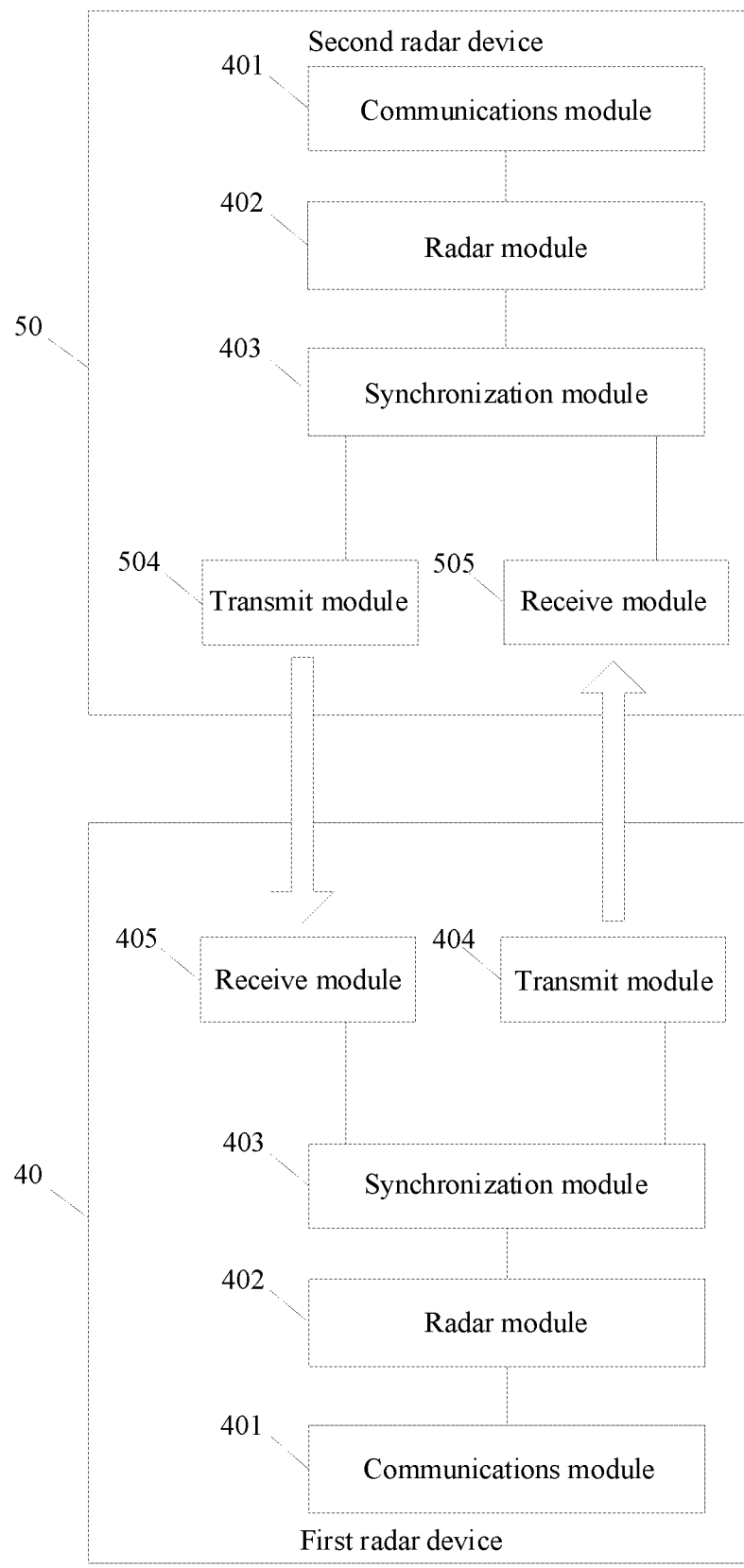
FIG. 13 is a schematic structural diagram of a first radar device, a schematic structural diagram of a second radar device, and a schematic diagram of a communications system including the first radar device and the second radar device according to an embodiment of the present disclosure.

FIG. 13 is a schematic structural diagram of a radar device of a first vehicle (a first radar device 40 for short), a radar device of a second vehicle (a second radar device 50 for short), and a communications system including the two radar devices according to an embodiment of the present disclosure. As shown in FIG. 13, a wireless communication connection may exist between the first radar device 40 and the second radar device 50, to implement data communication between the first radar device 40 and the second radar device 50. Functional modules of the first radar device 40 and the second radar device 50 may be implemented by hardware, software, or a combination of hardware and software to implement the solutions of the present disclosure. In a specific embodiment, the first radar device 40 and the second radar device 50 may also be implemented by the hardware components in the embodiment in FIG. 1. A person skilled in the art should understand that the functional blocks described below may be combined or divided into several sub-blocks to implement the solutions of the present disclosure. Therefore, the content described in the present disclosure above may support any combination, division, or further definition of the following functional modules. Detailed descriptions are provided below.

As shown in FIG. 13, the first radar device 40 may include a communications module 401, a radar module 402, a synchronization module 403, and a first transceiver module, where the first transceiver module may further include a transmit module 404 and a receive module 405. For example, in a possible embodiment, the communications module 401 may be implemented in the MCU 103, the radar module 402 may be implemented in the MMIC, the synchronization module 403 may be implemented in the MCU 103, and the first transceiver module may be implemented by the transmit antenna and the receive antenna. Details are as follows.

The communications module 401 is configured to obtain a first communication message.

The radar module 402 is configured to modulate a communication frequency of the first communication message of the first vehicle to an operating frequency, where the operating frequency is in an operating band of the radar device of the first vehicle.

The radar module 402 is further configured to generate a periodic radar signal.

The transmit module 404 is configured to transmit a radar signal, and is further configured to transmit the first communication message to the radar device of the second vehicle within a time gap between sending of the radar signal and sending of a next radar signal.

In a specific embodiment, the radar module 402 is further configured to modulate, through frequency shift keying FSK, the first communication message into a first carrier signal that is at the operating frequency.

The transmit module 404 is further configured to send, by the radar device of the first vehicle, the first carrier signal to the radar device of the second vehicle within the time gap between sending of the radar signal and sending of the next radar signal.

In a specific embodiment, the time gap includes a first sending time range, and the first sending time range indicates a time window within which the first vehicle sends the first communication message within the time gap.

The transmit module 404 is further configured to send, by the radar device of the first vehicle, the first carrier signal to the radar device of the second vehicle within the first sending time range.

In a specific embodiment, the transmit module 404 is further configured to repeatedly send N first carrier signals to the radar device of the second vehicle within the first sending time range. Duration used for repeatedly sending the N first carrier signals is shorter than or the same as the first sending time range.

In a specific embodiment, the first communication message includes first synchronization information, and the first synchronization information is used to indicate a sending time point of the first communication message.

In a specific embodiment, the first communication message includes at least one of motion information of an environmental target, status information of the first vehicle, a request for status information of the second vehicle, and a request for the motion information of the environmental target.

The motion information of the environmental target is used to indicate at least one of a distance, a speed, an acceleration, and an angle of the environmental target relative to the first vehicle. The status information of the first vehicle is used to indicate at least one of a driving speed, an acceleration, steering, and a location of the first vehicle. The status information of the second vehicle is used to indicate at least one of a driving speed, an acceleration, steering, and a location of the second vehicle.

In a specific embodiment, the time gap further includes a first receiving time range, and the first receiving time range indicates a time window within which the first vehicle receives a second communication message of the second vehicle within the time gap. There is a fixed time interval between the first receiving time range and the first sending time range, and the fixed time interval is a positive number greater than or equal to 0.

The first radar device 40 further includes the receive module 405. The receive module 405 is configured to receive, within the first receiving time range, a second carrier signal returned by the radar device of the second vehicle based on the first carrier signal, where the second carrier signal carries the second communication message.

The radar module 402 is further configured to demodulate the second carrier signal to obtain the second communication message.

In a specific embodiment, the second communication message includes second synchronization information, and the second synchronization information is used to indicate a sending time point of the second communication message.

In a specific embodiment, a second sending time range is configured in the radar device of the second vehicle, and the second sending time range indicates a time window used by the second vehicle to send the second communication message.

The first radar device 40 further includes the synchronization module 403. The synchronization module 403 is configured to obtain the second sending time range based on the second synchronization information, adjust the first receiving time range within the time gap such that the first receiving time range is synchronized with the second sending time range, and duration of the first receiving time range is consistent with duration of the second sending time range.

In a specific embodiment, the synchronization module 403 is further configured to determine a start point and an end point of the second sending time range in time domain, adjust a start point of the first receiving time range within the time gap to align with the start point of the second sending time range, and adjust an end point of the first receiving time range within the time gap to align with the end point of the second sending time range.

As shown in FIG. 13, the second radar device 50 may include a communications module 501, a radar module 502, a synchronization module 503, and a second transceiver module, where the second transceiver module includes a transmit module 504 and a receive module 505. For example, in a possible embodiment, the communications module 501 may be implemented in the MCU 103, the radar module 502 may be implemented in the MMIC, the synchronization module 503 may be implemented in the MCU 103, and the second transceiver module may be implemented by the transmit antenna and the receive antenna.

The receive module 505 is configured to receive a first communication message of the radar device of the first vehicle.

The communications module 501 is configured to obtain a second communication message based on the first communication message.

The radar module 502 is configured to modulate a communication frequency of the second communication message to an operating frequency, where the operating frequency is in an operating band of the radar device of the second vehicle.

The radar module 502 is further configured to generate a periodic radar signal.

The transmit module 504 is configured to transmit a radar signal, and is further configured to transmit the second communication message to the radar device of the first vehicle within a time gap between sending of the radar signal and sending of a next radar signal.

In a specific embodiment, the receive module 505 is further configured to receive a first carrier signal sent by the radar device of the first vehicle, where the first carrier signal carries the first communication message.

The radar module 502 is further configured to demodulate the first carrier signal to obtain the first communication message.

In a specific embodiment, the time gap includes a second receiving time range, and the second sending time range indicates a time window within which the second vehicle receives the first communication message within the time gap.

The receive module 505 is further configured to receive the first communication message of the radar device of the first vehicle within the second receiving time range.

In a specific embodiment, the first sending time range is configured in the radar device of the first vehicle, and the first sending time range indicates a time window used by the first vehicle to send the first communication message. The first communication message includes first synchronization information, and the first synchronization information is used to indicate a sending time point of the first communication message.

The second radar device 50 further includes the synchronization module 503. The synchronization module 503 is configured to obtain the first sending time range based on the first synchronization information, adjust the second receiving time range within the time gap such that the second receiving time range is synchronized with the first sending time range, and duration of the second receiving time range is consistent with duration of the first sending time range.

In a specific embodiment, the synchronization module 503 is further configured to determine a start point and an end point of the first sending time range in time domain, adjust a start point of the second receiving time range within the time gap to align with the start point of the first sending time range, and adjust an end point of the second receiving time range within the time gap to align with the end point of the first sending time range.

In a specific embodiment, after the synchronization module 503 adjusts the second receiving time range within the time gap so that the second receiving time range is synchronized with the first sending time range, the transmit module is further configured to send the second communication message to the radar device of the first vehicle within the second sending time range.

It should be noted that for content that is not mentioned in the embodiment in FIG. 13 and specific implementation of the functional units, refer to the descriptions in the embodiments in FIG. 5 or FIG. 10, and details are not described herein again.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center in a wired (for example, a coaxial cable, an optical fiber, or a digital subscriber line) or wireless (for example, infrared or microwave) manner to another website, computer, server, or data center. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state disk), or the like.

In the foregoing embodiments, the descriptions in each embodiment have respective focuses. For a part that is not described in detail in an embodiment, refer to related descriptions in other embodiments.

What is claimed is:

1. A method for implementing radar-communication integration of a first vehicle implemented by a first radar device of the first vehicle, wherein the method comprises:
    obtaining a first communication message through a Controller Area Network (CAN) interface;
    modulating the first communication message onto a first carrier signal, wherein an operating frequency of the first carrier signal is in an operating band of the first radar device;
    sending a periodic radar signal using a transmit antenna of the first radar device, wherein the periodic radar signal is a chirp signal;
    sending a first radar signal at a first time in a current period;
    sending a second radar signal at a second time in a next period; and
    sending the first carrier signal to a second vehicle within a time gap between the first time and the second time.

2. The method of claim 1, further comprising:
    combining, using a monolithic microwave integrated circuit (MMIC) of the first radar device, the first carrier signal and the first radar signal into a radar-communication integration signal frame, wherein the radar-communication integration signal frame comprises the first radar signal and the first carrier signal in an alternate manner; and
    sending the radar-communication integration signal frame to the second vehicle using the transmit antenna.

3. The method of claim 1, wherein the time gap comprises a first sending time range and a first receiving time range, wherein the first sending time range indicates a first time window within which the first radar device sends the first carrier signal, wherein the first receiving time range indicates a second time window within which the first radar device receives a second carrier signal of the second vehicle, wherein the second carrier signal comprises a response to the first carrier signal, and wherein the method further comprises:
    sending the first carrier signal to the second vehicle within the first sending time range using the transmit antenna of the first radar device; and
    receiving, within the first receiving time range using a receive antenna of the first radar device, the second carrier signal from the second vehicle, wherein the second carrier signal carries a second communication message that is a response to the first communication message.

4. The method of claim 3, wherein the first communication message comprises first synchronization information indicating the first sending time range to enable the second vehicle to adjust, based on the first sending time range, a second receiving time range of the second vehicle to keep synchronization with the first sending time range, and wherein the second receiving time range indicates a third time window within which the second vehicle receives the first carrier signal.

5. The method of claim 3, wherein the second communication message comprises second synchronization information indicating a second sending time range, wherein the second sending time range indicates a fourth time window within which a second radar device of the second vehicle sends the second communication message, and wherein the method further comprises:
    obtaining the second sending time range based on the second synchronization information; and
    adjusting the first receiving time range within the time gap such that the first receiving time range is synchronized with the second sending time range, and a first duration of the first receiving time range is consistent with a second duration of the second sending time range.

6. The method of claim 1, wherein the first communication message further comprises first status information of the first vehicle indicating one or more of a driving speed, an acceleration, steering, or a location of the first vehicle.

7. The method of claim 1, wherein the first communication message further comprises a request for second status information of the second vehicle indicating a request for one or more of a driving speed, an acceleration, steering, or a location of the second vehicle.

8. A method for implementing radar-communication integration of a second vehicle implemented by a radar device of the second vehicle, wherein the method comprises:
   receiving, using a receive antenna of the radar device, a first carrier signal from a first vehicle within a time gap between sending of radar signals in adjacent periods, wherein the radar signals are chirp signals; and
   demodulating the first carrier signal to obtain a first communication message.

9. The method of claim 8, wherein the first communication message comprises first synchronization information indicating a first sending time range, wherein the first sending time range indicates a first time window within which the first vehicle sends the first carrier signal, wherein a second receiving time range and a second sending time range are configured in the radar device, wherein both the second receiving time range and the second sending time range are within a second time gap within which the radar device sends second radar signals in second adjacent periods, wherein a fixed time interval is between the second receiving time range and the second sending time range and is a positive number greater than zero, wherein the second receiving time range indicates a second time window within which the radar device receives the first carrier signal, wherein the second sending time range indicates a third time window within which the radar device sends a second carrier signal to the first vehicle, wherein the second carrier signal is a response to the first carrier signal, and wherein the method further comprises:
   adjusting the second receiving time range using a microcontroller unit (MCU) of the radar device after obtaining the first communication message, wherein the second receiving time range is synchronized with the first sending time range, and wherein a second duration of the second receiving time range is consistent with a first duration of the first sending time range; and
   returning the second carrier signal to the first vehicle within the second sending time range using a transmit antenna of the radar device, wherein the second carrier signal carries a second communication message that is a response to the first communication message.

10. The method of claim 9, wherein the second communication message comprises second synchronization information indicating the second sending time range to enable the first vehicle to adjust, based on the second sending time range, a first receiving time range of the first vehicle to keep synchronization with the second sending time range, and wherein the first receiving time range indicates a fourth time window within which the first vehicle receives the second carrier signal.

11. A first radar device of a first vehicle comprising:
   a Controller Area Network (CAN) interface configured to obtain a first communication message;
   a microcontroller unit (MCU) coupled to the CAN interface;
   a monolithic microwave integrated circuit (MMIC) coupled to the CAN interface and the MCU and configured to:
      modulate the first communication message into a first carrier signal, wherein an operating frequency of the first carrier signal is in an operating band of the first radar device; and
      generate a periodic radar signal, wherein the periodic radar signal is a chirp signal;
   a transmit antenna coupled to the MMIC and configured to:
      send a periodic radar signal;
      send a first radar signal at a first time in a current period;
      send a second radar signal at a second time in a next period; and
      send the first carrier signal to a second vehicle within a time gap between the first time and the second time; and
   a receive antenna coupled to the MMIC.

12. The first radar device of claim 11, wherein the MMIC is further configured to combine the first carrier signal and the first radar signal into a radar-communication integration signal frame, wherein the radar-communication integration signal frame comprises the first radar signal and the first carrier signal in an alternate manner, and wherein the transmit antenna is further configured to send the radar-communication integration signal frame to a second radar device of the second vehicle.

13. The first radar device of claim 11, wherein the time gap comprises a first sending time range and a first receiving time range, wherein the first sending time range indicates a first time window within which the first radar device sends the first carrier signal, wherein the first receiving time range indicates a second time window within which the radar device receives a second carrier signal of the second vehicle, wherein the second carrier signal is a response to the first carrier signal, wherein the transmit antenna is further configured to send the first carrier signal to the second vehicle within the first sending time range, wherein the receive antenna is configured to receive, within the first receiving time range, the second carrier signal from the second vehicle, and wherein the second carrier signal carries a second communication message that is a response to the first communication message.

14. The first radar device of claim 13, wherein the first communication message comprises first synchronization information indicating the first sending time range to enable the second vehicle to adjust, based on the first sending time range, a second receiving time range of the second vehicle to keep synchronization with the first sending time range, and wherein the second receiving time range indicates a third time window within which the second vehicle receives the first carrier signal.

15. The first radar device of claim 13, wherein the second communication message comprises second synchronization information indicating a second sending time range, wherein the second sending time range indicates a fourth time window within which a second radar device of the second vehicle sends the second communication message, wherein the MCU is configured to:
   obtain the second sending time range based on the second synchronization information; and
   adjust the first receiving time range within the time gap, wherein the first receiving time range is synchronized with the second sending time range, and wherein a first duration of the first receiving time range is consistent with a second duration of the second sending time range.

16. The first radar device of claim 11, wherein the first communication message further comprises status information of the first vehicle indicating one or more of a driving speed, an acceleration, steering, or a location of the first vehicle.

17. The first radar device of claim 11, wherein the first communication message further comprises a request for status information of the second vehicle indicating a request for one or more of a driving speed, an acceleration, steering, or a location of the second vehicle.

18. A radar device of a second vehicle comprising:
a microcontroller unit (MCU);
a transmit antenna;
a receive antenna configured to receive a first carrier signal from a first vehicle within a first time gap between sending of first radar signals in first adjacent periods, wherein the first radar signals are chirp signals; and
a monolithic microwave integrated circuit (MMIC) coupled to the MCU, the transmit antenna, and the receive antenna and configured to demodulate the first carrier signal to obtain a first communication message.

19. The radar device of claim 18, wherein the first communication message comprises first synchronization information indicating a first sending time range, wherein the first sending time range indicates a first time window within which the first vehicle sends the first carrier signal, wherein a second receiving time range and a second sending time range are configured in the radar device, wherein both the second receiving time range and the second sending time range are within a second time gap within which the radar device sends second radar signals in second adjacent periods, wherein a fixed time interval is between the second receiving time range and the second sending time range and is a positive number greater than or equal to zero, wherein the second receiving time range indicates a second time window within which the radar device receives the first carrier signal, wherein the second sending time range indicates a third time window within which the radar device sends a second carrier signal to the first vehicle, wherein the second carrier signal is a response to the first carrier signal, wherein the MCU is configured to adjust the second receiving time range, wherein the second receiving time range is synchronized with the first sending time range, wherein a second duration of the second receiving time range is consistent with a first duration of the first sending time range, wherein the transmit antenna is configured to return the second carrier signal to the first vehicle, wherein the second carrier signal carries a second communication message that is a response to the first communication message.

20. The radar device of claim 19, wherein the second communication message comprises second synchronization information indicating the second sending time range to enable the first vehicle to adjust, based on the second sending time range, a first receiving time range of the first vehicle to keep synchronization with the second sending time range, wherein the first receiving time range indicates a fourth time window within which the first vehicle receives the second carrier signal.

* * * * *